(12) United States Patent
Schei et al.

(10) Patent No.: US 12,217,509 B2
(45) Date of Patent: Feb. 4, 2025

(54) SYSTEMS AND METHODS FOR MONITORING AND BEHAVIOR ANALYSIS IN REAL-TIME USING ARTIFICIAL INTELLIGENCE

(71) Applicant: Hummingbirds AI, Inc., Miami, FL (US)

(72) Inventors: Nima Schei, Miami, FL (US); Hamed Tabkhivayghan, Miami, FL (US)

(73) Assignee: Hummingbirds AI, Inc.

( * ) Notice: Subject to any disclaimer, the term of this patent is extended or adjusted under 35 U.S.C. 154(b) by 351 days.

(21) Appl. No.: 17/881,640

(22) Filed: Aug. 5, 2022

(65) Prior Publication Data

US 2023/0041017 A1 Feb. 9, 2023

Related U.S. Application Data

(60) Provisional application No. 63/230,021, filed on Aug. 5, 2021.

(51) Int. Cl.
| | |
|---|---|
| *G06V 20/52* | (2022.01) |
| *G06V 20/40* | (2022.01) |
| *G06V 40/10* | (2022.01) |
| *G06V 40/20* | (2022.01) |
| *G06T 7/20* | (2017.01) |
| *G06T 9/00* | (2006.01) |

(52) U.S. Cl.
CPC .............. *G06V 20/52* (2022.01); *G06V 20/41* (2022.01); *G06V 40/10* (2022.01); *G06V 40/20* (2022.01); *G06T 7/20* (2013.01); *G06T 9/004* (2013.01)

(58) Field of Classification Search
None
See application file for complete search history.

(56) References Cited

U.S. PATENT DOCUMENTS

| | | | |
|---|---|---|---|
| 2013/0141366 A1* | 6/2013 | Ritter | G06F 3/041 345/173 |
| 2021/0056251 A1* | 2/2021 | Parmar | G06F 3/04847 |
| 2021/0185738 A1* | 6/2021 | John | H04W 72/56 |
| 2021/0383411 A1* | 12/2021 | Pazhyannur | G06V 20/52 |

* cited by examiner

*Primary Examiner* — Haris Sabah
(74) *Attorney, Agent, or Firm* — Jose Cherson Weissbrot

(57) ABSTRACT

The present disclosure provides a system for monitoring users/workplaces in real-time. The system includes video monitoring device(s) for capturing video frames of a user/workplace. The system also includes a client monitoring module including: a transceiving module for receiving credentials from the user; a user registration and authentication module for authenticating the user; and a processing module for: analysing the video frames in real-time to determine if object of interest(s) is present and accordingly determining at least one action of interest of the at least one object of interest; and determining if the object of interest is passing a predefined threshold. When object of interest passes the predefined threshold frames, the client monitoring module may analyse the video frames and take a preventive action or may send the video frames to a server for further analysis and preventive action.

20 Claims, 12 Drawing Sheets

600

```
┌─────────────────────────────────────────┐
│ RECEIVE THE VIDEO OF THE OBJECT OF INTEREST │
│ FROM A FIRST COMPUTING DEVICE OF A FIRST    │
│ USER FOR FURTHER ANALYSIS                   │
│ 602                                         │
└─────────────────────────────────────────┘
                    ▼
┌─────────────────────────────────────────┐
│ PROCESS AND ANALYSE THE RECEIVED VIDEO AND  │
│ VIDEO STREAM IN REAL-TIME TO DETERMINE IF   │
│ THERE IS AN OBJECT OF INTEREST PRESENT IN THE│
│ WORKPLACE                                   │
│ 604                                         │
└─────────────────────────────────────────┘
                    ▼
┌─────────────────────────────────────────┐
│ DETERMINE IF THERE IS AN ACTION OF INTEREST OF│
│ THE OBKJECT OF INTEREST SO AS TO IDENTIFY A │
│ THREAT                                      │
│ 606                                         │
└─────────────────────────────────────────┘
                    ▼
┌─────────────────────────────────────────┐
│ STORETHE ANALYSED VIDEO IN CASE OF THE      │
│ IDENTIFIED THREAT                           │
│ 608                                         │
└─────────────────────────────────────────┘
                    ▼
┌─────────────────────────────────────────┐
│ ALERT A SECOND USER ALONG WITH THE          │
│ ENCRYPTED AND ANALYSED VIDEO FOR FURTHER    │
│ INVESTIGATION                               │
│ 610                                         │
└─────────────────────────────────────────┘
```

FIGURE 6

SYSTEMS AND METHODS FOR MONITORING AND BEHAVIOR ANALYSIS IN REAL-TIME USING ARTIFICIAL INTELLIGENCE

TECHNICAL FIELD

The presently disclosed subject matter generally relates to the field of data processing. More particularly, the present disclosure relates to systems and methods for monitoring users and their associated workplaces in real-time.

BACKGROUND

Workforce is vital for running a business or an organization. Workforce may include people engaged in or available for work in a particular organization or industry. For example, the workforce of an organization may include its employees, consultants, third party vendors, and so forth. Workforce monitoring is the practice of employers (e.g. organizations) overseeing the activity of their employees (or customers in some instances) and their associated workplace usually with the goal of ensuring that workers are being productive and not involved in any activity that may be a threat to the organization or its clients. The workforce monitoring primarily includes collecting data of user (e.g. employee of an organization) activity and monitoring the data to identify certain types of employee behavior, that can either put the organization at risk or be detrimental to organization's bottom line. Further, businesses often turn to workforce monitoring by actively tracking employees' behaviour, performance, backgrounds, and their associated work places to maintain legal compliance, data security and employee productivity. Workforce monitoring is critical for businesses involving confidential information such as banks, financial institutions, defence institutions, healthcare, and so forth.

Typically, when the employees are working from office, supervisors and technologies are used for monitoring them and their associated workplace. However, now workforce monitoring is more challenging than ever due to technology advances that allow it to easily hide or avoid supervision, especially for remote workforce. Further, with a post-pandemic cultural shift and interest toward remote working, there is even a much more demand for innovative technologies to enable working at home for sensitive jobs for example jobs involving confidential information (e.g. credit card information, company data etc.) of clients.

Currently, there exist cloud-based techniques for workforce monitoring but usually they are expensive to scale due to current cloud computing costs, requirement of high bandwidth and most importantly lack of privacy.

It is an object of the present invention to overcome or ameliorate the above-discussed disadvantages of the prior art, or at least offer a useful alternative.

SUMMARY

The present disclosure provides a system and a method for monitoring a user and his/her associated workplace in real-time. The user may be any person or entity engaging with an organization for a work project or service. The non-limiting examples of the user may include an employee, a consultant, a vendor, clients, and so forth.

The present disclosure also provides a system and a method for privacy first workplace monitoring and employee behavior analysis in real-time. Employee may be a person doing a work (e.g. full-time, part-time, contract work) for an organization.

The present disclosure also provides a system and a method for privacy-aware workforce status and performance monitoring and fraud detection in real-time. The non-limiting examples of the status and performance may include the time spent by the first user 114 in front of the computer, hours sitting, number of times standing, etc. The system and method may enable an employer or a supervisor of an employee to determine if the employee is involved in an activity that can be risky for the organization. Examples of such activity may include, but are not limited to, copying or recording confidential information such as name, contact numbers, credit card details etc. of the clients, clicking pictures or capturing videos of confidential documents of the organization, and so forth.

The present disclosure also provides a system and method for privacy first workplace monitoring and employee behavior analysis in real-time by maintaining the privacy of the employee (or the user of the system).

The present disclosure provides systems and methods to enable privacy-aware workforce monitoring on legacy hardware devices i.e. existing laptop, web cameras etc.

An embodiment of the present disclosure provide a system for monitoring one or more users and workplaces of the one or more users in real-time. The system includes at least one video monitoring device configured to capture video frames of a first user of the one or more users and workplace of the first user post authentication of the first user. The system also includes a client monitoring module including a transceiving module configured to receive login credentials from the first user. The client monitoring module also includes a user registration and authentication module configured to authenticate an identity of the first user based on the received login credentials. The client monitoring module also includes a processing module configured to process and analyse the captured video frames in real-time to determine if at least one object of interest is present in the workplace. The object of interest may include unauthorized objects, unlisted objects, and defective objects (such as defective products in a manufacturing factory or assembly line). Upon detection of the at least one object of interest, the processing module may determine at least one action of interest of the at least one object of interest and determine (for example, based on the comparison of the detected object of interest/action with stored predefined examples of the action of interest/objects and their thresholds) if at least one of the object of interest and action is passing a predefined threshold of the object of interest. Further, the processing module may take a preventive action when the at least one of the object of interest or action passes the predefined threshold.

According to an aspect of the present disclosure, the client monitoring module is at least one of communicably connected to or installed within a first computing device associated with the first user.

According to another aspect of the present disclosure, the preventive action comprising at least one of sending a warning message to the first user, ending a session of the first user on the first computing device, encrypting and sending video frames showing the at least one object of interest and associated action of interest to at least one of a server and a second computing device associated with a second user, and shutting down the first computing device.

According to another aspect of the present disclosure, the transceiving module is further configured to send one or more video frames showing the at least one object of interest and action of interest to at least one of a server and a second computing device associated with a second user when the at least one of the object of interest and action of interest passes the predefined threshold. Hereinafter, an action of interest may also be referred as action without change in its meaning.

According to another aspect of the present disclosure, the server includes a server analysis module to assess a threat.

According to another aspect of the present disclosure, wherein the server analysis module is further configured to analyse at least one of the received one or more video frames and a video stream in real-time to assess the threat, wherein the analyzing comprises action of interest detection and behavioral analysis of the first user while maintaining the privacy of the first user and workplace of the first user. The video stream may include video frames of the first user that are being captured and streamed to the server by the video monitoring device in real-time.

The analysis of the video frames may be performed by maintaining privacy of the first user (or the one or more users) and associated workplace(s). In some embodiments, the privacy of the first user may include an identity, skin color, eye color, hair color, facial information, and any other personality identifiable information of the first user. The privacy of the workplace may include privacy of room environment and authorized objects such as keyboard present in the surrounding, background of the first user so as to protect the workplace to be not recognizable by any third party or unauthorized individuals. To maintain the privacy, one or more privacy layers (e.g. privacy layer on the first user by blurring the face of the user, and a privacy layer on the workplace by blurring the background, objects like keyboard, mouse, headphones present in the workplace) may be imposed on the video frames to an extent that the user and the workplace is not recognizable to a third party for example, a client of the organization.

When the server analysis module detects a threat, the server analysis module may perform at least one of: take at least one preventive action; and send an alert message along with the analysed video frames showing the at least one object of interest and associated action to the second computing device for further analysis. The alert message along with the analysed video frames is encrypted prior to sending.

According to another aspect of the present disclosure, the second computing device further comprises a supervisor monitoring module configured to assign the one or more users to at least one second user for supervision.

According to another aspect of the present disclosure, the supervisor monitoring module is configured to display status and performance of the first user in a color coded manner on the second computing device. The non-limiting examples of the status and performance may include the time spent by the first user 114 in front of the computer, hours sitting, number of times standing, etc.

When the supervisor monitoring module receives at least one of the one or more video frames showing the at least one object of interest and associated action of interest from the client monitoring module and an alert message from the server, the supervisor monitoring module may analyse at least one of the received one or more video frames and a video stream in real-time to assess the threat and take at least one preventive action based on the assessment of the threat. The video stream in real-time may include video frames of the first user that are being captured and streamed to the supervisor monitoring module by the video monitoring device in real-time. The analysis may include action of interest detection and behavioral analysis of the first user while maintaining the privacy of the first user and workplace of the first user. The object of interest may include unauthorized objects, unlisted objects, and defective objects (such as in factory lines). The action of interest may include unauthorized actions, unlisted actions, and abnormal actions, such as disorientation.

According to another aspect of the present disclosure, the processing module is further configured to guide the first user for installing the at least one video monitoring device.

According to another aspect of the present disclosure, wherein system also includes a storage module configured to store data comprising at least one of captured video frames, analysis data, user information, information about a plurality of object of interest, action of interest associated with an object of interest, type of incidents, time of incidents, captured video frames of the object of interest, investigation reports, predefined threshold of the plurality of object of interest/action of interest, authentication data, user guide, preventive actions, and user registration information.

In some embodiments, the storage module is located on at least one of the first computing device, the client monitoring module, the at least one server, and the second computing device.

In some embodiments, the client monitoring module includes the storage module.

In other embodiments, the first computing device includes the storage module.

In alternative embodiments, the server includes the storage module.

According to another aspect of the present disclosure, the processing module is further configured to receive a feedback about the accuracy of the detection of the object of interest and the action(s) of the action of interest from at least one of the at least one server and the second user.

According to another aspect of the present disclosure, the processing module is further configured to continuously improve the object of interest detection and action of interest detection based on the feedback.

In some embodiments, the client monitoring module and server analysis module uses artificial intelligence methods or models for object of interest and action of interest detection. In such embodiments, the client monitoring module and server analysis module may learn and train the AI methods and models based on the feedback for better object of interest/action of interest detection.

According to another aspect of the present disclosure, the user registration and authentication module is further configured to determine whether the first user is registered with the system/client monitoring module/first computing device and enable the first user to register with the system/client monitoring module/first computing device.

Another embodiment of the present disclosure provides a method for monitoring one or more users and workplaces of the one or more users in real-time. The method includes receiving, by a client monitoring module associated with a first computing device, login credentials from a first user of the one or more users. The method also includes authenticating, by the client monitoring module, an identity of the first user based on the received login credentials. The method further includes capturing, by at least one video monitoring device communicably connected to the client monitoring module, video frames of the first user and workplace of the first user post authentication. The method further includes processing and analyzing, by the client monitoring module, the captured video frames in real-time to determine if there is at least one object of interest present in the workplace. The method further includes determining, by the client monitoring module, at least one action of the at least one object of interest upon detection of the at least one object of interest. Further, the method also includes determining, by the client monitoring module, if at least one of the object of interest and action is passing a predefined threshold of the object of interest. Furthermore, the method includes taking, by the client monitoring module, a preventive action when the at least one of the object of interest and action passes the predefined threshold.

The client monitoring module may be communicably connected to the first user.

Alternatively, the client monitoring module may be installed within a first computing device associated with the first user.

The preventive action (and the at least one preventive action) may include at least one of sending a warning message to the first user, ending a session of the first user on the first computing system, sending video frames showing the at least one object of interest and associated action to at least one of a server and a second computing device associated with a second user, and shutting down the first computing device.

According to an aspect of the present disclosure, the method includes sending, by the client monitoring module, one or more video frames showing the at least one object of interest and action to at least one of a server and a second computing device associated with a second user when the at least one of the object of interest and action passes the predefined threshold, wherein the server includes a server analysis module to assess a threat.

According to an aspect of the present disclosure, the method further includes performing, by the server analysis module, at least one of the following steps: analysing the at least one of the received one or more video frames and a video stream in real-time to assess the threat, wherein the analyzing comprises action of interest detection and behavioral analysis of the first user while maintaining the privacy of the first user and workplace of the first user; upon detection of the threat, performing at least one of: taking at least one preventive action; and sending an alert message along with the analysed video frames showing the at least one object of interest and associated action to the second computing device for further analysis. The video stream may include video frames of the first user that are being captured and streamed to the server by the video monitoring device in real-time.

According to another aspect of the present disclosure, the method further includes assigning, by a supervisor monitoring module of the second computing device, the one or more users to at least one second user for supervision and displaying, by the supervisor monitoring module, status and performance of the first user in a color coded manner on the second computing device.

According to another aspect of the present disclosure, receiving, by a supervisor monitoring module of the second computing device, at least one of the video frames showing the at least one object of interest and associated action from the client monitoring module and an alert message from the server. The method also includes analysing at least one of the received one or more video frames and video stream in real-time to assess the threat, wherein the analyzing comprises action of interest detection and behavioral analysis of the first user while maintaining the privacy of the first user and workplace of the first user; and taking the preventive action based on the assessment of the threat. The video stream may include video frames of the first user that are being captured and streamed to the supervisor monitoring module by the video monitoring device in real-time.

According to another aspect of the present disclosure, the method further includes guiding, by the processing module, the first user for installing the at least one video monitoring device.

According to another aspect of the present disclosure, the method further includes storing, in a storage module, data comprising at least one of captured video frames, analysis data, user information, information about a plurality of object of interest, action(s) of interest associated with object of interest, captured video frames of the object of interest, predefined threshold of the plurality of object of interest, authentication data, user guide, and user registration information. The storage module is located on at least one of the first computing device, the client monitoring module, the at least one server, and the second computing device.

In some embodiments, the client monitoring module is a stand alone system that may be communicably connected to a first computing device of the first user.

In alternative embodiments, the client monitoring module is installed within the first computing device of the first user.

A yet another embodiment of the present disclosure provides a system for monitoring a user and workplace of the user in real-time. The system includes at least one video monitoring device configured to continuously capture video frames of the user and a workplace of the user after authentication of the user. The system also includes a client monitoring module configured to receive login credentials from the user. The client monitoring module is also configured to authenticate an identity of the user based on the login credentials. The client monitoring module is further configured to process and analyse the captured video frames in real-time (i.e. the video being captured in real-time) to detect if there is at least one object of interest present in the workplace of the user. The client monitoring module is further configured to determine at least one action of the detected at least one object of interest upon detection of the at least one object of interest. The client monitoring module is further configured to determine if at least one of the object of interest and action is passing a predefined threshold of the object of interest. The client monitoring module is further configured to store the video frames showing the at least one object of interest and associated action on the computing device when the object of interest passes the predefined threshold. The client monitoring module is further configured to analyse the video frames showing the at least one object of interest and associated action and video stream in real-time to assess a threat. The video stream may include video frames of the first user that are being captured and streamed by the video monitoring device in real-time. The client monitoring module is further configured to take a preventive action upon detection of the threat.

The action(s) of interest may include unauthorized actions, unlisted actions, and abnormal actions, such as disorientation.

The preventive action may include at least one of sending a warning message to the user, ending a session of the user on the computing system, shutting down a display of the computing device, and shutting down the computing device.

The communication of messages and exchange of videos (i.e. captured video, analysed video) among the client monitoring module, the server, and the second device is encrypted and/or may occur over a secure network (e.g. VPN).

These together with the other aspects of the present disclosure, along with the various features of novelty that characterize the present disclosure, are pointed out with particularity in the present disclosure. For a better understanding of the present disclosure, its operating advantages, and its uses, reference should be made to the accompanying drawings and descriptive matter in which there are illustrated exemplary embodiments of the present disclosure.

BRIEF DESCRIPTION OF THE DRAWINGS

The foregoing summary, as well as the following detailed description of various embodiments, is better understood when read in conjunction with the drawings provided herein. For the purposes of illustration, there is shown in the drawings exemplary embodiments; however, the presently disclosed subject matter is not limited to the specific methods and instrumentalities disclosed.

FIG. 6 is a flowchart illustrating a method for processing a video of the object of interest received on a server from the first computing device of the first user, in accordance with an embodiment of the present disclosure.

DETAILED DESCRIPTION

Figure 1A:
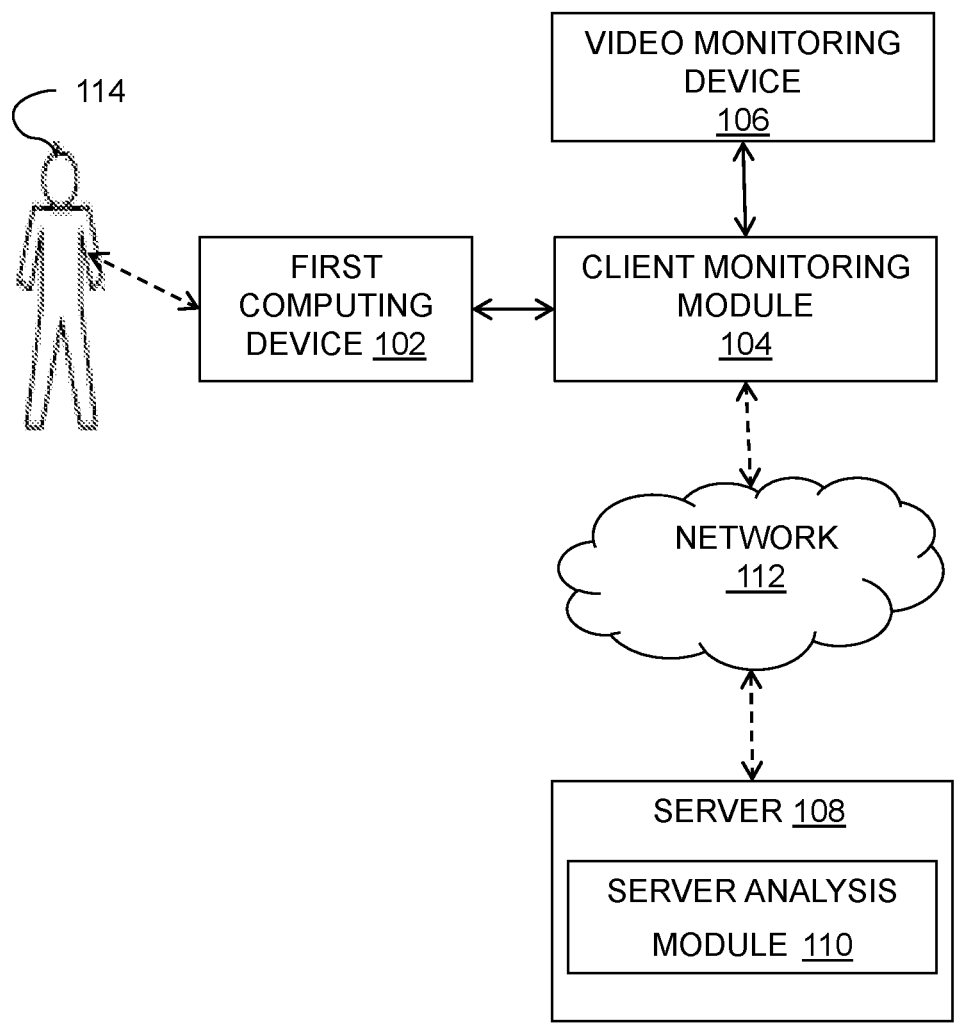
FIGS. 1A-1E illustrate exemplary environments where various embodiments of the present disclosure may function.

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

As used herein, a device or a module may refer to a device or combination of devices that may include hardware, software, firmware, or combination of these. The module may be machine-implemented instructions.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

All numeric values are herein assumed to be modified by the term "about," whether or not explicitly indicated. The term "about" generally refers to a range of numbers that one of skill in the art would consider equivalent to the recited value (i.e., having the same or substantially the same function or result). In many instances, the terms "about" may include numbers that are rounded to the nearest significant figure. The recitation of numerical ranges by endpoints includes all numbers within that range (e.g., 1 to 5 includes 1, 1.1, 1.01, 1.05, 1.2, 1.08, 1.3, 1.4, 1.5, 1.6, 1.7.1.8, 1.9, 2, 2.75, 3, 3.80, 4, and 5).

The following detailed description should be read with reference to the drawings, in which similar elements in different drawings are identified with the same reference numbers. The drawings, which are not necessarily to scale, depict illustrative embodiments and are not intended to limit the scope of the disclosure.

It is to be understood that both the foregoing general description and the following detailed description are exemplary and explanatory only, and are not restrictive of the invention, as claimed. In this application, the use of the singular includes the plural, the word "a" or "an" means "at least one", and the use of "or" means "and/or", unless specifically stated otherwise. Furthermore, the use of the term "including", as well as other forms, such as "includes" and "included", is not limiting. Also, terms such as "element" or "component" encompass both elements and components comprising one unit and elements or components that comprise more than one unit unless specifically stated otherwise.

The present disclosure provides a system for monitoring a first user and his/her associated workplace primarily with a purpose of detecting any object of interest and its action that may be a threat. In some embodiments, the system may include a client monitoring module and a server analysis module. The client monitoring module may be either installed within a first computing device of the first user or may be communicably connected to the first computing device of the first user. The first computing device may be a laptop, a desktop computer, a mobile phone, a smart television, a smart phone, a chip processor, an AI processor, a vision processing unit (VPU), and so forth. Further, the client monitoring module includes at least one video monitoring device configured to continuously capture audio/video/images of the user and workplace surrounding of the first user in real-time. The client monitoring module is configured to process and analyse (also referred as first stage analysis) the capture video frames to detect (and/or record) if there is any object of interest and an action of the object of interest. Further, the client monitoring module may determine if the detected action is suspicious enough to be reported to a server. The client monitoring module may be configured to determine if an action to be reported by comparing the action of the object of interest with predefined threshold of the object of interest. When the client monitoring module detects an object of interest passing the certain predefined threshold, the system may store the captured video frames of the object of interest and its action on the first computing device and send the video frames (and/or additional information such as, but not limited to, timestamp, computing device ID, object of interest details etc.) to at least one the server for further analysis (hereinafter may also be referred as second stage analysis). The client monitoring module is configured to perform all these functions in real-time, while protecting the privacy of the user. The client monitoring module is also configured to communicate with the server analysis module via a network for example, virtual private network.

The server analysis module may be either installed within a server or may be communicably connected to the server. The server analysis module may perform complex action of interest detection and behavioral analysis, focusing on the behavior of the first user (e.g. employee), without knowing an identity, color of the skin, facial information or any personally identifiable information of the first user. In some embodiments, the server may be an edge-server configured to perform further analysis on a selective number of videos that have already been flagged and identified by (or received from) the client monitoring module. For example, to frequently evaluate the decision-making process on the captured videos, and learn and improve the accuracy of first decision makers (e.g. supervisors of the first user 114) and or learn from the dependencies of variables, such as type of incident/threat, type of object, frequency, time, and several other parameters. The server analysis module may perform comprehensive analysis of the received video frames of the object of interest to assess a threat (if any) and accordingly alert a second user e.g. supervisor of the user.

In some embodiments, the system also includes a supervisor monitoring module that may be either installed on a second computing device of a second user (e.g., employer of the user, supervisor of the user etc.) or may be communicably connected to the second computing device. The supervisor monitoring module enables the second user to further investigate the threat from the analysed video frames received from the server.

FIGS. 1A-1E illustrates exemplary environments 100A-100E where various embodiments of the present disclosure may function. As shown in FIG. 1A, the environment 100A includes a first computing device 102, a client monitoring module 104 communicably connected to the first computing device 102, at least one video monitoring device 106 communicably connected to the client monitoring module 104 (and/or the first computing device 102), and a server 108 including a server analysis module 110. The client monitoring module 104 and server 108 can communicate with each other via a network 112. In some embodiments, the network 112 is a virtual private network (VPN). The first computing device 102 is associated with a first user 114. The server 108 may be associated with an organization. In an example, the first user 114 may be any person or employee of the organization.

The at least one video monitoring device 106 may be configured to watch and/or capture pictures/audio/video frames of the first user 114 and his/her workplace (i.e. the surrounding environment) of the first user 114. In some embodiments, the at least one video monitoring device 106 is configured to capture video frames of the first user 114 and workplace of the first user 114 post authentication of the first user 114. In some embodiments, the at least one video monitoring device 106 is configured to capture video frames of the first user 114 and workplace of the first user 114 during working hours of the first user 114. The working hours may be a time period during which the first user 114 is supposed to work for the organization (or an employer of the first user 114). Further, when the first user 114 logs off the first computing device 102, the at least one video monitoring device 106 stops capturing/watching or streaming the video of the first user 114 and workplace of the first user 114 to first computing device 102. The non-limiting examples of the at least one video monitoring device 106 may include a USB webcam, a CCTV camera, a camera with RSTP streaming capabilities. In some embodiments, the at least one video monitoring device 106 may have physical shutters, in order to give peace of mind to the first user 114. The at least one video monitoring device 106 may need to be installed above the desk, preferably as close to the ceiling as possible. In some embodiments, a tripod is used to mount the at least one video monitoring device 106 on. The length of the recommended tripod is 2 meters, but 1.5 meters is sufficient. The at least one video monitoring device 106 is installed in such a manner so that a birds-eye view over the sitting first user 114 and his/her workplace is captured. The workplace may include the desk of the first user 114, the objects on the desk, and other the surroundings of the first user 114. In some embodiments, at least one video monitoring device 106 includes a shutter to cover a lens of or close the video monitoring device.

In some embodiments, the client monitoring module 104 enables the first user 114 to enter login credentials and/or other information on the first computing device 102 for accessing the first computing device 102 or registering with the client monitoring module 104/first computing device 102. Examples of the login credentials may include such as, but not limited to, a username, a password, an email address, and biometrics input (e.g. face-map, finger prints, etc.).

In some embodiments, the client monitoring module 104 may guide the first user 114 about how to install and configure a setup of the client monitoring module 104. Further, the client monitoring module 104 may guide the first user 114 in the optimal location of the at least one video capturing device 106, and if the first user 114 need to adjust the location or angel of the at least one video capturing device 106. Further, the client monitoring module 104 may ask the first user 114 to move around to get more familiar with the first user 114 and his/her workplace. After successful installation, the first user 114 may need to either enter login credentials at the first computing device 102 and/or look up the client monitoring module 104, each time the first user 114 wants to access the client monitoring module 104 or the first computing device 102. In some embodiments, if the first user 114 logs in at the beginning of the day or when the first user 114 leaves the workplace for more than 2-3 seconds, the client monitoring module may freeze the first computing device 102, and may prompt the first user 114 to log in again with login credentials, to make sure the correct or authorized person is sitting behind the first computing device.

Figure 1B:
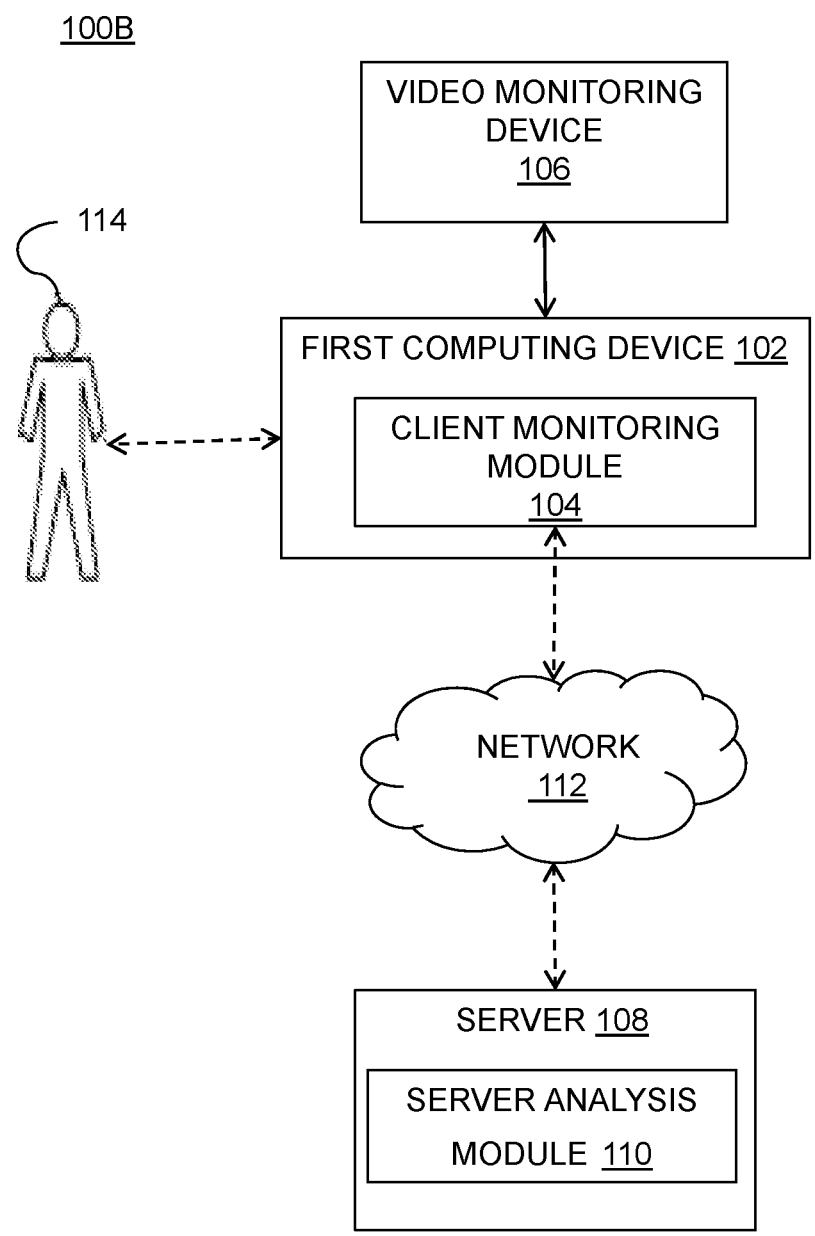

In some embodiments, the client monitoring module 104 may be inbuilt or installed within the first computing device 102 as shown in the environment 100B in FIG. 1B.

In some embodiments, the client monitoring module 104 may be configured to capture/collect additional metrics of the first user 114, such as, but not limited to, the amount of time looking into the screen, and the tiredness of the first user, blinking, eye movements, of the first user 114 etc. The metrics may be captured upon the consent of the first user 114 (i.e. employee) and the request of the second user 120 (i.e. employer or supervisor). The client monitoring module 104 may be configured to remove the personally identifiable information of the user 114 from these metrics. These metrics may be used (e.g. by the supervisor, or the employer)

for optimizing working hours to improve first users' 114 performance and boost first users' 114 mental and physical health.

The client monitoring module 104 is configured to receive the captured video frames of the first user 114 and his/her workplace from the video monitoring device 106. In some embodiments, the client monitoring module 104 or the video monitoring device 106 may send the captured video frames of the first user 114 and his/her workplace to the server 108 for processing and analysis that may include object of interest detection, action of interest detection and taking a preventive action. The action(s) of interest may include unauthorized actions, unlisted actions, and abnormal actions, such as disorientation.

In alternative embodiments, the client monitoring module 104 may process and analyse the captured video frames or video streaming in real-time to determine if there is at least one object of interest. Non-limiting examples of the object of interest may include a mobile phone, a camera, a notebook, an audio/video recorder, a paper, a pen, personal laptop, food, drink, and a weapon. When there is at least one object of interest present in the workplace of the first user 114, then client monitoring module 104 may detect at least one action of the object of interest. Further, the client monitoring module 104 may determine if at least one of the object of interest and action is passing a predefined threshold of the object of interest. Further, the client monitoring module 104 may take at least one preventive action when the at least one of the object of interest and action passes the predefined threshold.

The non-limiting examples of the preventive action includes sending a warning message to the first user, ending a session of the first user 114 on the first computing device 102, sending video frames showing the at least one object of interest and associated action to at least one of the server 108 and a second computing device 116 associated with a second user 118, and shutting down the first computing device 102.

Figure 1C:
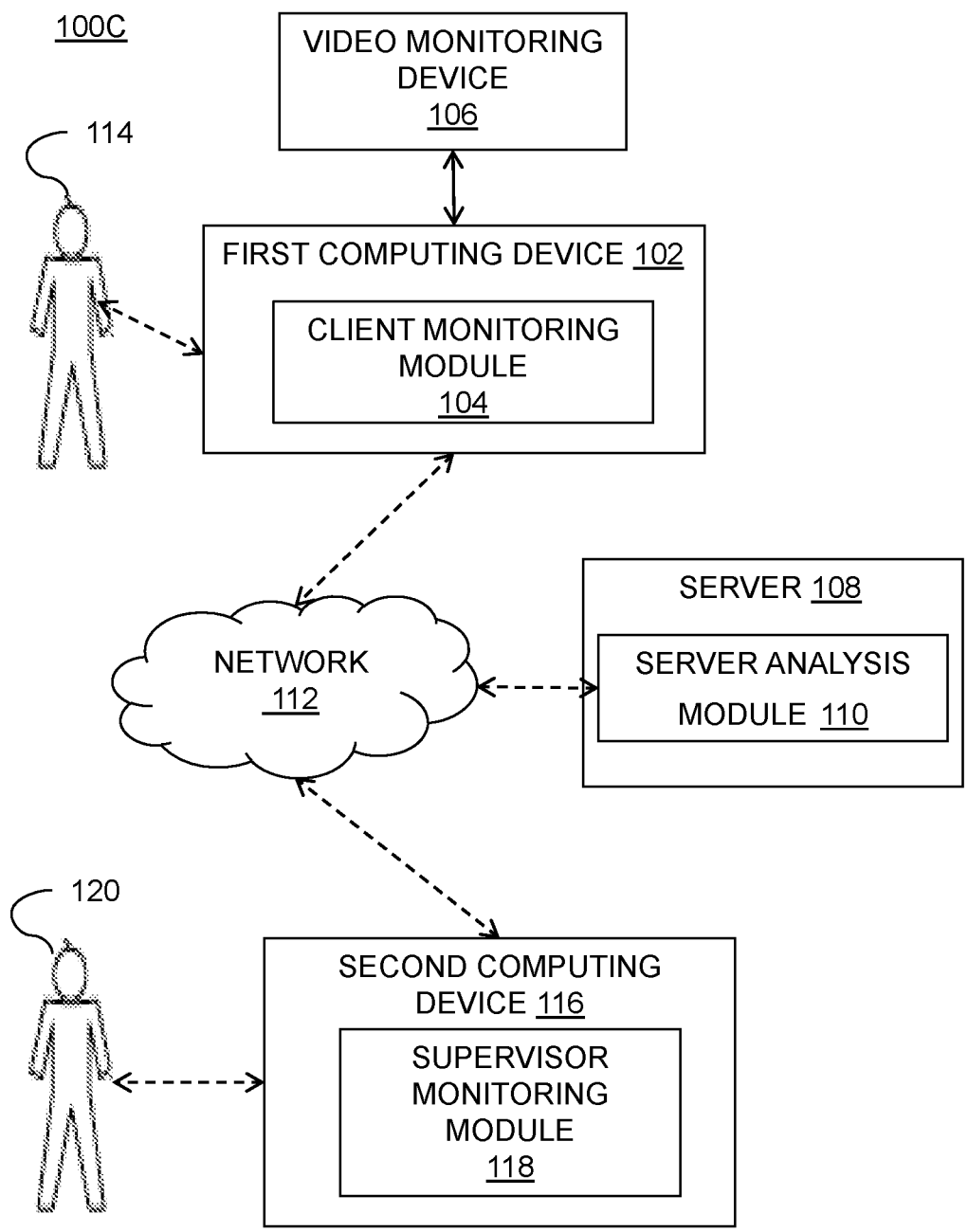

As shown in FIGS. 1A-1C, the client monitoring module 104 sends one or more video frames showing the object of interest and action to the server 108. In some embodiments, the client monitoring module 104 compresses the video, reduces the frame per second, prior to sending a copy to the server 108. In some embodiments, the server 108 may be an edge-server located in the office of the organization. In alternative embodiments, the server 108 may be located in a cloud network. In some embodiments, the server 108 may be a state-of-the-art server (for example, edge-server) within the Virtual Private Network (VPN) 112.

The server analysis module 110 of the server 108 is configured to receive the one or more video frames of the object of interest from the client monitoring module 104. The server analysis module 110 may analyse the one or more video frames and/or video stream in real-time. The video stream may include video frames of the first user 114 that are being captured and streamed to the server analysis module 110 by the video monitoring device 106 in real-time.

The analysis the one or more video frames/video stream may include action of interest detection and behavioral analysis of the first user 114 while maintaining the privacy of the first user 114 and workplace of the first user 114. In an example, the server analysis module 110 may analyse the one or more video frames/video stream to detect an action of interest and analyse the behavior of the first user 114, without knowing his/her identity, color of skin, facial information or any other personally identifiable information. The server analysis module 110 may analyse the selective number of videos/video frames that have been already flagged and identified (i.e. the video/video frames including object of interest/action of interest) by the client monitoring module 104. For example, to frequently evaluate the decision-making process on the captured videos, and learn and improve the accuracy of first decision makers (e.g. supervisors of the first user 114) and or learn from the dependencies of variables, such as type of incident/threat, type of object, frequency, time, and several other parameters.

The server analysis module 110 performs comprehensive analysis of the one or more video frames to assess the threat. The server analysis module 110 may take at least one preventive action upon detection of the threat.

In some embodiments, upon detection of the threat, the server analysis module 110 may send an alert message along with the analysed video frames showing the at least one object of interest and associated action to a second computing device 116 for further analysis. Non-limiting examples of a threat may include leakage of confidential information (e.g. client information, pricing information, employees information, etc.) out of the organization, any action risking organization's or their client's reputation, stealing confidential information e.g. through taking pictures of the screen, writing etc.

Turning now to FIG. 1C, the environment 100C includes the first computing device 102 including the client monitoring module 104, the first user 114, the video monitoring device 106, the server 108 including the server analysis module 110, the second computing device 116 including a supervisor monitoring module 118, and the second user 120. As shown in FIG. 1C, the server analysis module 110 is configured to send (for example, upon detection of a threat) an alert message(s) and/or the analysed video frames to a second computing device 116 of a second user 120 for further analysis. The supervisor monitoring module 118 is configured to receive at least one of the one or more video frames showing the at least one object of interest and associated action from the client monitoring module 104 and an alert message/analysed video frames from the server 108. Further, the supervisor monitoring module 118 is configured to display the one or more video frames, and the alert message/analysed video frames on the second computing device 116. In some embodiments, upon receiving at least one of the one or more video frames showing the at least one object of interest and associated action from the client monitoring module 104 and an alert message from the server 108, the supervisor monitoring module 118 is configured to analyse at least one of the received one or more video frames and video stream in real-time to assess the threat. The video stream may include video frames of the first user 114 that are being captured and streamed to the supervisor monitoring module 118 by the video monitoring device 106 in real-time. The analyzing may include action of interest detection and behavioral analysis of the first user 114 while maintaining the privacy of the first user 114 and workplace of the first user 114. In some embodiments, the supervisor monitoring module 118 may take at least one preventive action (e.g. warning the first user 114, shutting down a display of the first computing device 102 etc.) based on the assessment of the threat.

In some embodiments, the supervisor monitoring module 118 may be configured to assign or enable the second user 120 to assign the one or more users to at least one second user 120 for supervision. The supervisor monitoring module 118 may be configured to display status and performance of the first user 114 in a color coded manner on the second computing device 116.

In some embodiments, the supervisor monitoring module 118 may also enable the second user 120 to investigate/analyse the analysed video frames. The supervisor monitoring module 118 may enable the second user 120 to generate one or more reports based on the investigation of the analysed video frames. Further, the supervisor monitoring module 118 may be configured to enable the second user 120 to view status and performance of the first user 114 for example, in a color coded manner on the second computing device 116 in real-time during the working hours of the first user 114.

Figure 1D:
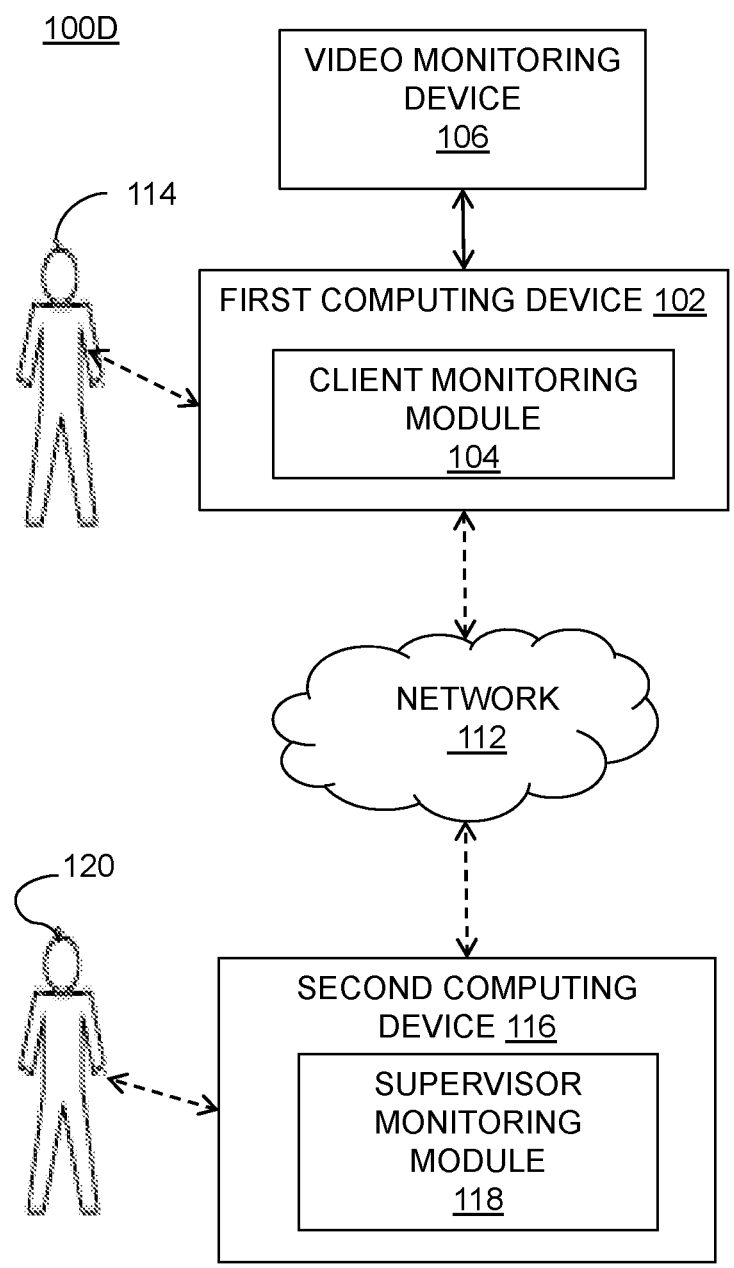

Turning now to FIG. 1D, the environment 100D includes the first user 114 associated with the first computing device 102 including the client monitoring module 104. Though the client monitoring module 104 is shown to be included in the first computing device 102, but as described above, the client monitoring module 104 may be a stand alone system or may be external to the first computing device 102 and may remain communicably connected to the device 102. The environment 100D also includes the at least one video monitoring device 106 configured to view or capture video of the first user 114 and his/her associated workplace. The environment 100D also includes the second computing device 116 including the supervisor monitoring module 118. The second computing device 116 is associated with and accessible to the second user 120 that may be a supervisor of the first user 114. In such embodiments, the functions of the server analysis module 108 as described in FIGS. 1A-1C can be performed by the supervisor monitoring module 118.

In such embodiments, upon detection of any object of interest and action, the client monitoring module 104 sends an alert message along with the video frames showing the object of interest/action to the second user 120 for further analysis or investigation.

Figure 1E:
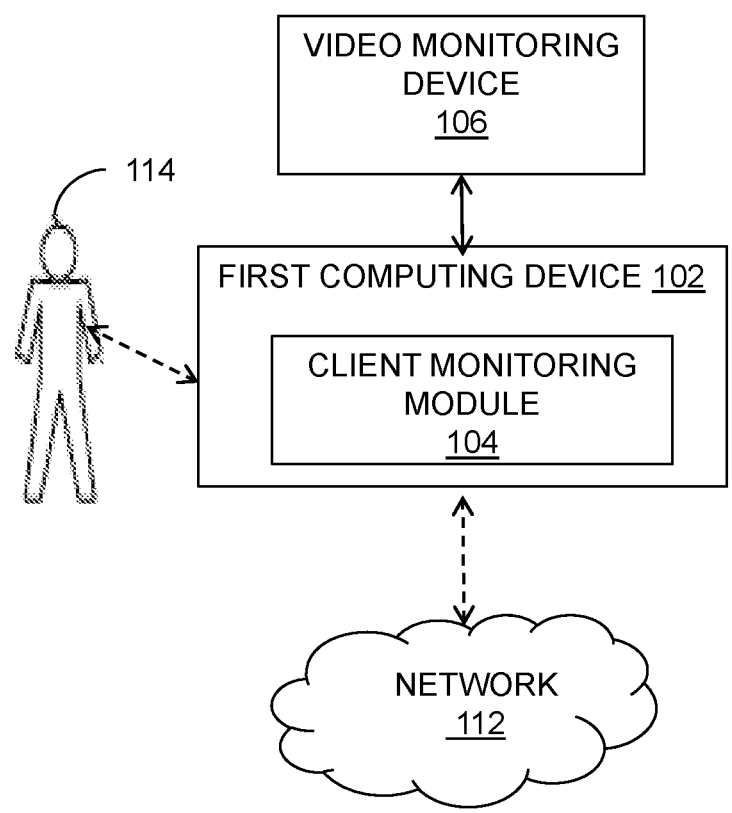

Turning now to FIG. 1E, the environment 100E includes the first user 114, the first computing device 102 including the client monitoring module 104, and the video monitoring device 106. The client monitoring module 104 is configured to receive login credentials from the first user 114, and may authenticate the first user 114 based on login credentials entered by the first user 114. The client monitoring module 104 may accordingly trigger the video monitoring device 106 to initiate capturing of video after authentication of the first user 114. The client monitoring module 104 running on the first computing device 102 is configured to receive the video/video frames from the video monitoring device 106. The client monitoring module 104 may process and analyse the captured video frames in real-time to detect if there is at least one object of interest present in the workplace of the user 114. Upon detection of the at least one object of interest, the client monitoring module 104 may determine at least one action of the detected at least one object of interest.

Further, the client monitoring module 104 may be configured to determine if at least one of the object of interest and action is passing a predefined threshold of the object of interest. When the object of interest passes the predefined threshold, the client monitoring module 104 may store the video frames (or video) showing the at least one object of interest and associated action on the first computing device 102. The client monitoring module 104 may analyse the video frames (or video) showing the at least one object of interest and associated action to assess a threat (e.g. a system crash of the organization, information leak, stealing client data, etc.). The client monitoring module 104 may take one or more preventive actions upon detection of the threat. The examples of the one or more preventive actions may include at least one of sending a warning message to the first user 114, ending a session of the first user 114 on the first computing system 102, shutting down a display of the first computing device 114, and shutting down the first computing device 102. In an exemplary scenario, when the module 104 detects an object of interest or action or an unauthorized person in front of the first computing device 102, the display screen may automatically show a warning instantaneously. If it's repeated more than a certain number of warnings, the display screen may shut down or go blank.

In the environment 100E, the processing of video/video frames is performed 100% on the first computing device 102 as the module 104 is installed and running on the device 102. Though the first computing device 102 may remain connected to the network 112 or the VPN 112 for accessing Internet or other resources (like official documents, client information etc.).

Non-limiting examples of the first computing device 102 and the second computing device 116 may include a computer, a laptop, a tablet computer, and a smart television, a chip processor, an AI processor, and a vision processing unit (VPU).

In some embodiments, the environment 100A-100E may include a storage module configured to store data comprising at least one of captured video frames, analysis data, user information, information about a plurality of object of interest, preventive actions, warning messages, action (i.e. action of interest) associated with object of interest, captured video frames of the object of interest/first user, predefined threshold of the plurality of object of interest, authentication data, user guide, and user registration information. The storage module may be located on at least one of the first computing device 102, the client monitoring module 104, the at least one server 108, and the second computing device 116.

In some embodiments, all the communication between the first computing device 102 (and/or the client monitoring module 104), the server 108, the second computing device 116 are established within the VPN 112 for example a clients' VPN network to ensure the cyber security protocols.

In some embodiments, at least one of the client monitoring module 104, server analysis module 110, and the supervisor monitoring module 118 may store records and log of incidents containing the time of the incident, action of interest, object of interest, etc. This information can be used (in some embodiments, by the second user 120) for investigation, such as forensic investigation of internal fraud (or action of interest) or accidents.

Further, as shown in the FIGS. 1A-1E, the client monitoring module 104 may be configured to receive a feedback about the accuracy of the detection of the object of interest and the action(s) of the action of interest from at least one of the at least one server 108 and the second user 120. In some embodiments, the client monitoring module 104 is also configured to continuously improve the object of interest detection and action of interest detection based on the feedback. For example, to frequently evaluate the decision-making process on the captured videos, and learn and improve the accuracy of first decision makers (e.g. supervisors of the first user 114) and or learn from the dependencies of variables, such as type of incident/threat, type of object, frequency, time, and several other parameters. In an exemplary scenario, the client monitoring module 104 is configured to continuously improve the detection of object of interest and their associated action (i.e. an action of interest) based on the feedback response of the second user 120 (e.g. supervisor of the first user 114) or from the server 108. For example, the second user 120 may agree with the objects/action detected by the module 104, or the second user 120 may disagree with the objects/action detected by the module 104 and the module 104 to improve its performance and functionality may use the feedback. In some embodiments, the module 104 may use suitable artificial intelligence (AI) based methods for object/action of interest detection. For example, if the module 104 detects an electric plug as a mobile phone and the supervisor disagrees, the module 104 learns to not consider that object as a mobile phone in future and looks for the next highest probability. Similarly, if the module 104 detects an action of using the mobile phone taking a call as recording a video of the first computing device 102 then the supervisor may provide a feedback and accordingly the module 104 saves the feedback and learns from it for future action of interest detection.

Figure 2:
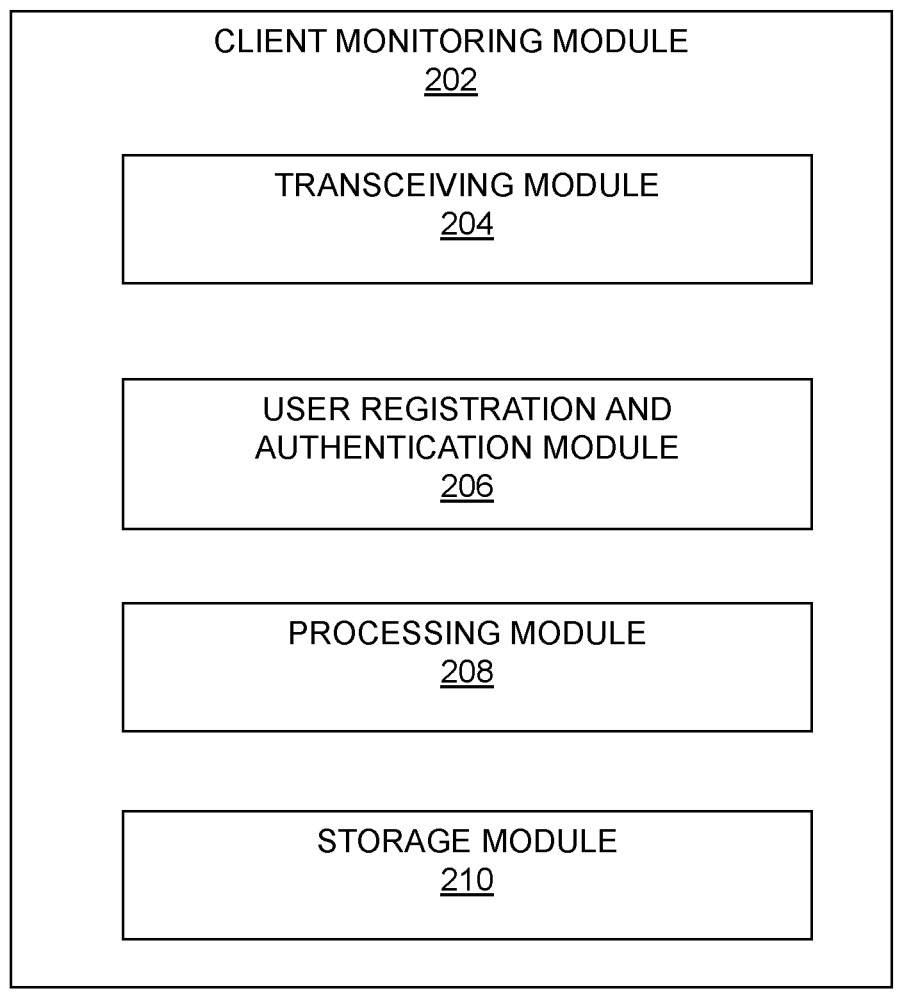
FIG. 2 is a block diagram illustrating system elements of an exemplary client monitoring module, in accordance with an embodiment of the present disclosure.

FIG. 2 is a block diagram 200 illustrating system elements of an exemplary client monitoring module 202, in accordance with an embodiment of the present disclosure. The client monitoring module 202 may include hardware, software, firmware and combination of these. The client monitoring module 202 may be communicably connected to the first computing device 102 or installed or embedded within the first computing device 102. In some embodiments, the client monitoring module 202 may be a standalone system is configured to process the video footage of the first user 114 and associated workplace on the first computing device 102. In alternative embodiments, the client monitoring module 202 may connect with other devices/users (e.g., the server 108, the device 116, the second user 120 as discussed above) via the network 112 (or VPN 112). In some embodiments, the other user may perform some of the processing on the other devices. For example, the supervisor (i.e. the second user 120) of an employee (i.e. the first user 114) of an organization may take a preventive action based on the selected video footage that shows the object of interest/action. Based on the situation, the supervisor may manually block access of the first device 104 by the employee (i.e. the first user 114) or take further action (e.g. suspension of the employee, lodging a complaint of the employee etc.).

As shown, the client monitoring module 202 primarily includes a transceiving module 204, a user registration and authentication module 206, a processing module 208, and a storage module 210.

As discussed with reference to FIGS. 1A-1E, the first user 114 (e.g. an employee) can access the first computing device 102 (e.g. a laptop provided by his/her employer) by providing login credentials. In some embodiments, the first user 114 provides the login credentials via gestures (for example, gazing into the video monitoring device 106, or waving at the device 106) or biometric input. In alternative embodiments, the first user 114 enters the login credentials by using a suitable input device (e.g. a keyboard, a mouse, a camera, a joystick, a microphone etc.) of the first computing device 102.

The transceiving module 204 is configured to receive login credentials (e.g. face scan, username, password, fingerprint, and so forth) from the first user 114. In some embodiments, the transceiving module 204 is configured to receive data of the first user 114 and his/her workplace from the at least one video monitoring device 106. The received data may include captured video frames and video.

The user registration and authentication module 206 is configured to authenticate an identity of the first user 114 based on the received login credentials. In some embodiments, upon receiving the login credentials, the user registration and authentication module 206 determines whether the first user 114 is registered with the first computing device 102 and/or the client monitoring module 202 by checking for a matching record in the storage module 210 of client monitoring module 202 or in the first computing device 102 and the server 108. When the first user 114 is not registered with the first computing device 102 and/or the client monitoring module 202, the user registration and authentication module 206 may prompt the first user 102 to register and enable the first user 114 to register with the computing device 102 and/or the client monitoring module 202. The first user 114 may register by providing information such as, username, password, name, email ID, date of birth, finger print, face scan, biometric data, and so forth. After registration, the user registration and authentication module 206 may create and store a record of the first user 114 in the storage module 210. In some embodiments, after entering login credentials and entering the account for example, client account or work account, the module 206 enables the first user 114 to set up the face matching process (similar to face scan and registration process that is available in existing smart phones for locking/unlocking phone).

In some embodiments, the processing module 208 may guide the first user 114 in the optimal location of the video monitoring device 106, and an angle of the device 106 needs to be adjusted. The processing module 208 may also ask or prompt the first user 114 to move around to get more familiar with the first user 114 and his/her environment. The processing module 208 is configured to process and analyse the captured video frames (or video footage) of the first user 114 in real-time to determine if at least one object of interest is present in the workplace of the first user 114. Upon detection of the at least one object of interest in the workplace of the first user 114, the processing module 208 may determine at least one action of the at least one object of interest. For example, the processing module 208 detects a paper and pen in the video frames, then the processing module 208 determines if there is any action happening by the paper and pen, like moving, writing, etc. The processing module 208 is also configured to determine if the object of interest and/or the action is passing a predefined threshold of the object of interest. For example, when a pen and paper is detected, then writing something on the paper may be considered as passing a threshold of the pen and paper action and a video recording of the pen and paper is saved on the storage module 210. In some embodiments, when the client monitoring module 202 is connected to at least one of the server 108 and the second computing device 116, then passing of the threshold may trigger recording, saving and sending of the video of the pen and paper to the server 108 or the second computing device 116 for further analysis that may involve more complex analysis and evaluation of the object of interest and the action. The transceiving module 204 may send the video frames showing the at least one object of interest and associated action of interest to the at least one server 108 or the second device 116 when the object of interest passes the predefined threshold of the object of interest/action. In some embodiments, the video frames are encrypted prior to sending to the at least one server 108 or the second device 116. Further, the video frames are encrypted and saved.

When the client monitoring module 202 is the standalone system, then the video frames are not streamed to the centralized server 108, rather all processing and analysis is performed by the client monitoring module 202 running on the local device i.e. the first computing device 102 itself. If an action of interest (for example, the first user 114 writing something on the paper) is detected, the video frames showing the object of interest/action can be stored on the storage module 210 and analyse it further to identify a threat (if any).

In some embodiments, the storage module 210 of the client monitoring module 202 and/or the storage module of the first computing device 102 may store the predefined threshold of the object of interest and associated actions (including action(s) of interest) for further processing and analysis. In some embodiments, at least one of the client monitoring module 104, server analysis module 110, and the supervisor monitoring module 118 may store records and log of incidents containing the time of the incident, action of interest, object of interest, etc. This information can be used (for instance by the client monitoring module 104) for investigation, such as forensic investigation of internal fraud or accidents.

The processing module 208 may determine action(s) of interest of the object of interest and compare it with the predefined threshold to determine if further processing or analysis for threat identification is required. In some embodiments, the processing module 208 does the further processing or analysis. Further, the processing module 208 may take a preventive action when the at least one of the object of interest and action passes the predefined threshold. In alternative embodiments, when the at least one of the object of interest and action passes the predefined threshold, the transceiving module encrypts and sends the one or more video frames showing the object of interest and/or the action to the server 108 or the second computing device 116 for further processing and analysis. The preventive may include at least one of sending a warning message to the first user 114, ending a session of the first user 114 on the first computing device 102, encrypting and sending video frames showing the at least one object of interest and associated action of interest to at least one of the server 108 and the second computing device 116 associated with the second user 120, and shutting down the first computing device 102.

In some embodiments, the processing module 208 may be configured to capture/collect/derive additional metrics of the first user 114, such as, but not limited to, the amount of time looking into the screen, and the tiredness of the first user, blinking, eye movements, of the first user 114 etc. from the videos. The metrics may be captured upon the consent of the first user 114 (i.e. employee) and the request of the second user 120 (i.e. employer or supervisor). The processing module 208 may be configured to remove the personally identifiable information of the user 114 from these metrics. These metrics may be used (e.g. by the supervisor, or the employer) for optimizing workforce (e.g. employees) working hours to improve first users' 114 performance and boost first users' 114 mental and physical health.

In some embodiments, the processing module 208 is configured to receive a feedback about the accuracy of the detection of the object of interest and the action(s) of the action of interest from at least one of the server 108 and the second user 120. In some embodiments, the processing module 208 is configured to continuously improve the object of interest detection and action of interest detection based on the feedback.

Though not shown, but the client monitoring module 202 may also include more modules for example, but not limited to, a display module for displaying information to the first user 114, a network interface module for connecting and communication to the network 112 and other devices connected to the network such as the server 108, the second computing device 116, etc. In some embodiments, the client monitoring module 202 may include fewer modules than shown in the FIG. 2, in such embodiments, the functioning of the one or more modules 204-210 can be combined into one module.

Figure 3:
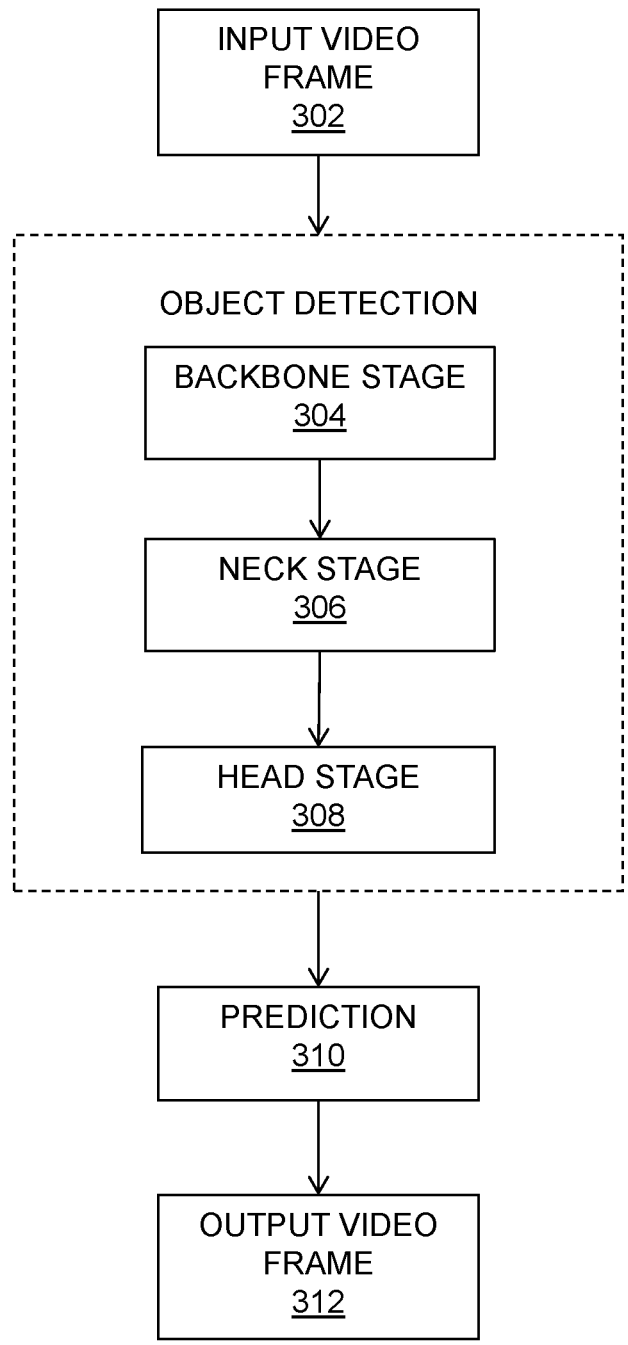
FIG. 3 is a flowchart illustrating a method for object of interest detection, in accordance with an embodiment of the present disclosure.

FIG. 3 is a flowchart illustrating a method 300 for object of interest detection in real-time, in accordance with an embodiment of the present disclosure. As discussed with reference to FIGS. 1A-1D and FIG. 2, the client monitoring module 104 (or 202) is configured to process and analyse the video frames captured by the video monitoring device 106 (e.g. a webcam) so as to determine if there is any object of interest present in the workplace (for example, on the desk, near the working laptop, or in surrounding) of the first user 114.

To this context, all required processing (i.e. the method 300) is performed on the first computing device e.g. on employee's laptop, using existing off-the-shelf webcam, without the need to transfer the videos to cloud or outside of the company's Virtual Private Network (VPN) for processing. The webcam may stream the footage/video of the first user 114 and the surrounding environment in real-time and store these footages/videos in the laptop/workstation of the first user 114. The client monitoring module 104 may be communicably connected to or running on the first computing device 102 and may primarily process these footages/videos and looks for object of interest or activities. In some embodiments, the client monitoring module 104 uses artificial intelligence based methods for processing and analyzing these footages/videos.

The client monitoring module 104 may use an agile object detection algorithm configured to run on legacy windows laptop and detect the objects of interest (object of interest). The object detection algorithm on the client monitoring module 104 has been trained and customized based on the object classes that are important for remote workers and employees and businesses e.g. in call centers. Whenever the client monitoring module 104 detects object of interest, passing a certain threshold, the client monitoring module 104 may perform further analysis of the video frames and take a preventive action as discussed above or may encrypt and send the video to the server 108/second computing device 116 for more complex action of interest detection and behavioral analysis of the first user 114.

The method 300 is for object detection related to detecting banned objects in privacy-aware business such as call centers, defense services organizations, health organization etc. The client monitoring module 104 may perform the method 300. At step 302, the client monitoring module 104 receives the video stream (from the video monitoring device 106) and performs object localization, detection, and classification in three stages. The stages are Backbone 304, Neck 306, and Head 308. The backbone 302 may be an extension over Moilenetv3. The Neck 304 and head 306 may use convolutional layers with a pyramid structure to enable high-accuracy lightweight object detection in real-time even on legacy laptops. At step 310, an object of interest (if present) is predicted in the video frames. The object of interest may include unauthorized objects, unlisted objects, and defective objects (such as in factory lines).

When the primary processing is happening, if the client monitoring module 104 detects/predicts an object of interest (such as pen, paper, notebook, phone, extra laptop, food, drink etc.) 308, then the client monitoring module 104 records the video and stores it locally on the first computing device 102 at step 312 (for example, in a specific compartment of the storage device or hard drive of the first computing device 102).

The client monitoring module 104 may also compress the video, reduce the frame per second, encrypt, and send a copy of the video to the server 108 (e.g. edge-server) that may be located in the office of enterprise (e.g. employer of the first user 114). In some embodiments, this step is optional and is reserved for when additional computation is required for example for complex behavior analysis. Further, in some embodiments, the copy of the video is saved and shared with the server 108 (and/or with the second computing device 116) when the probability of an object of interest or behavior is above a predefined threshold.

Figure 4:
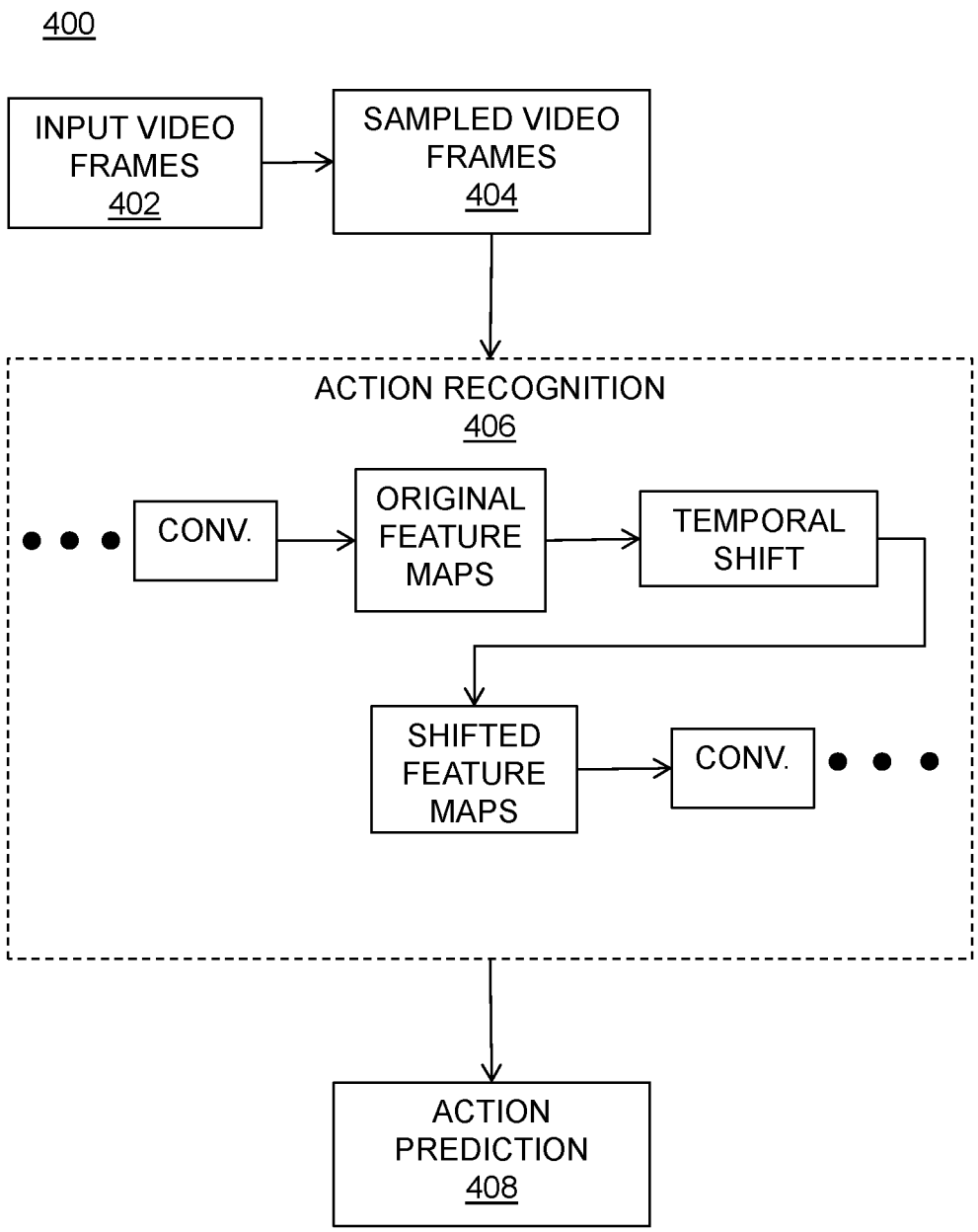
FIG. 4 is a flowchart illustrating a method for detecting an action of the object of interest detected in FIG. 3, in accordance with an embodiment of the present disclosure.

FIG. 4 is a flowchart illustrating a method 400 for detecting an action of interest of the object of interest detected in FIG. 3, in accordance with an embodiment of the present disclosure. In some embodiments, the action(s) of interest may include unauthorized actions, unlisted actions, and abnormal actions, such as disorientation.

The method 400 is an agile action of interest detection method. The action of interest detection method 400 is capable of running even on legacy laptop devices with limited computational power. As it is shown in the FIG. 4, a group of video frames (about 40 frames) are received at 402. The client monitoring module 104 may receive the video frames. At step 404, the input video frames are sampled to generate sampled video frames. At step 406, the client monitoring module 104 may analyse the video frames to classify the action (if any) related to behaviors of the first user(s) (e.g. employees in the call centers). The classification of action(s) of interest may integrate Time Shift Modules (TSM), and a 2D convolutional operator to capture and correlate both special and temporal information of the input video frames. Then at step 408, the output is the classified action associated with the input video stream.

As discussed in FIGS. 3-4, above processing and other tasks like such as face registration and matching, user authentication, and local object of interest and action of interest detections are happening on the first computing device 102. In this state, there is no data or video streaming to the centralized server 108 (it may be a server of the employer of the first user 114), rather all processing is performed on the device 102. If an action of interest is detected, the steam can be forwarded to the server 108 for more complex analysis and evaluation.

Beside, keeping all the required processing and data transfer local, independent from the cloud or third party network, the disclosed system including the client monitoring module, server analysis module, and/or supervisor monitoring module leverage innovative algorithmic solutions to further protect the privacy of our customers and their employees during processing and analysis of the video frames. The disclosed system is able to segment the users' (e.g. first user 114) personally identifiable information in real-time in order to protect the identity and personal appearance of the users, and also making the surrounding environment unrecognizable. The privacy may be maintained by blurring the background, face etc. of the user or by embedding a privacy layer in the workplace or face of the user. The amount of opacity of the privacy layer is adjustable from 0 to 100 percent, according to the needs of the client (or the employer).

In some embodiments, the system (including the client monitoring module 104, the server analysis module 110, and/or the supervisor monitoring module 118) implements at least two privacy layers in some embodiments. The first privacy layer is a privacy layer on top of the first user 114 (e.g. employee's face) so as to make the identity of the first user 114 unknown and unrecognizable from any outside observer (for example client of the employer). This also further protects the user's privacy by hiding and color-coding his/her visual representation.

The second privacy layer may be imposed on top of objects (allowed objects), such as the keyboard, mouse, ID card, and room environment (e.g. pictures in the workplace etc.) so as to protect the environments and surrounding area to be not recognizable with any third party, or unauthorized individuals. The workplace can be an office when the first user 114 is working from office. The workplace is a home of the first user 114 when the first user 114 is working from home.

In some embodiments, the privacy layers may be imposed by at least one of the client monitoring module 104, the server analysis module 110 and the supervisor monitoring module 118.

Figure 5A:
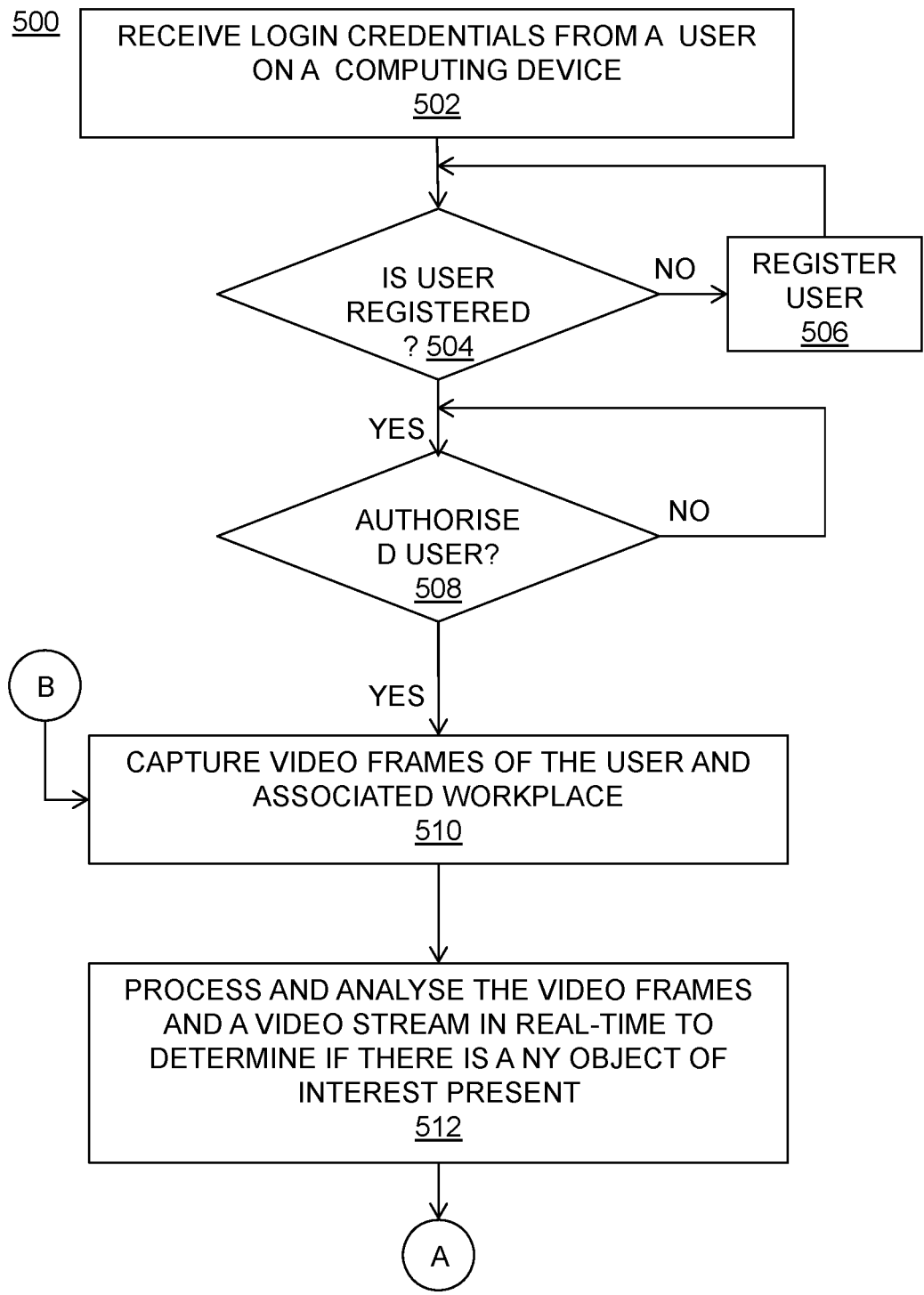
FIGS. 5A-5C is a flowchart illustrating a method for workplace monitoring and user behavior analysis on the first computing device of a first user, in accordance with an embodiment of the present disclosure.
Figure 5B:
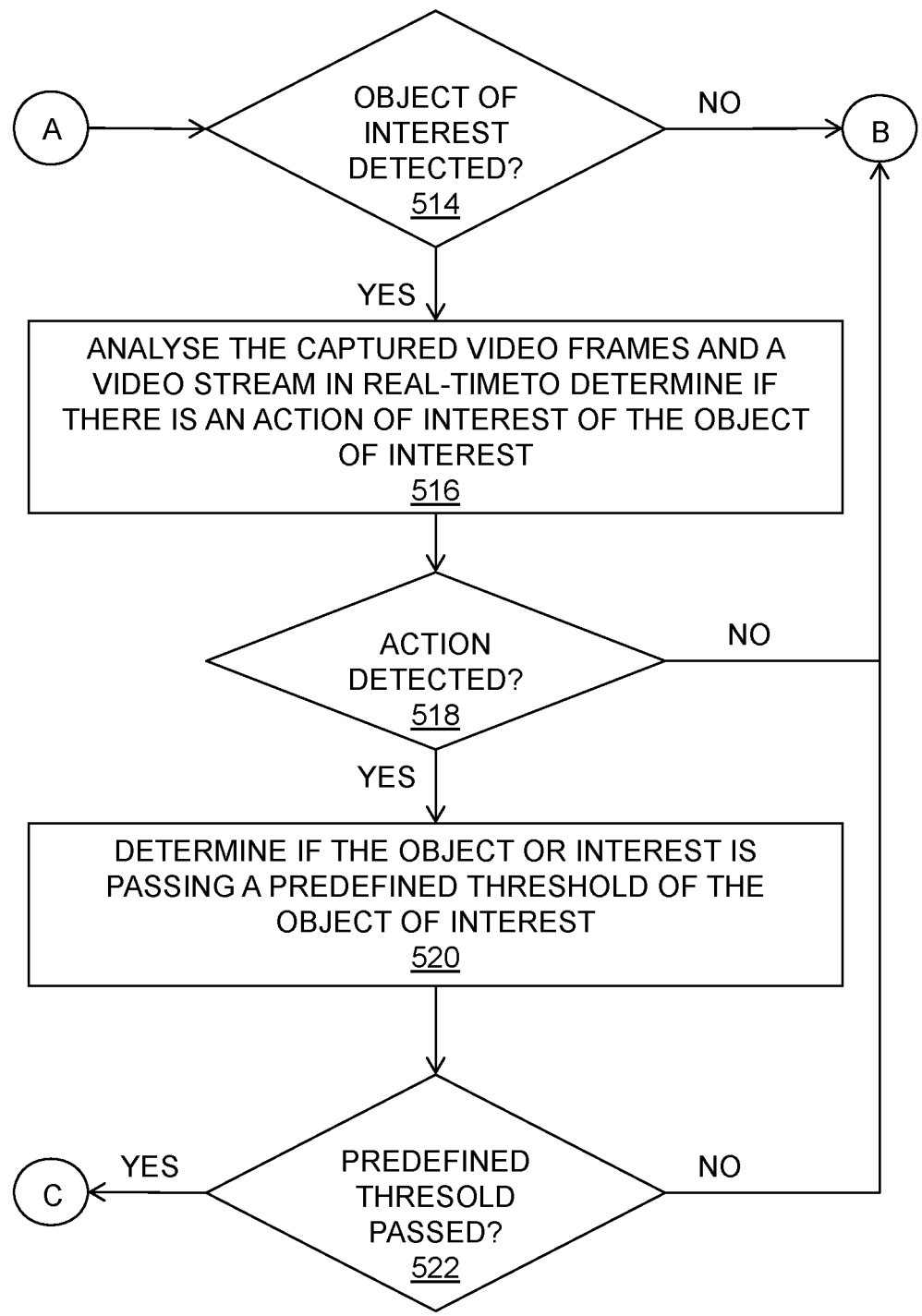
Figure 5C:
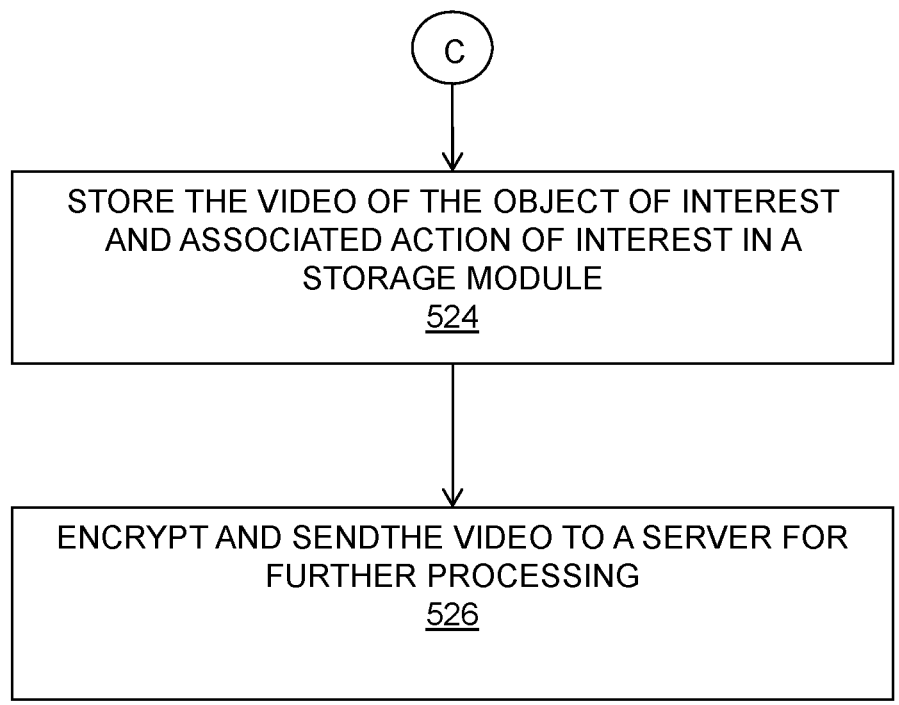

FIGS. 5A-5C depicts a flowchart illustrating a method 500 for workplace monitoring and user behavior analysis on the first computing device (102) of a first user (114), in accordance with an embodiment of the present disclosure.

At step 502, login credentials are received from a user such as the first user 114 as discussed with reference to FIGS. 1A-1D and FIG. 2. The login credentials may be entered by the first user 114 on an input device e.g. a keyboard, a mouse, a microphone, camera etc. of the first computing device 102 (e.g. a laptop). In some embodiments, the login credential include a face map and in this embodiment the face of the first user 114 may be scanned and matched as login credentials for example by the camera of the first computing device or by the at least one video monitoring device 106. In some embodiments, the login credentials may be received by the transceiving module 204 of the client monitoring module 202 (or 104) for processing as discussed with reference to FIG. 2. In alternative embodiments, the login credentials are received by the first computing device 102 and supplied to the client monitoring module 202 for authentication of the first user 114.

At step 504, the user registration and authentication module 206 checks if the first user 114 is a registered user based on the received login credentials. If no, then at step 506 the registration and authentication module 206 enables the first user 114 to register with the client monitoring module 202. For example, the registration and authentication module 206 may scan the face of the user 114 and/or prompt user to enter more information like name, password etc. for registration. After registration, the user registration and authentication module 206 stores the information like face mapping of the user 114 in the storage module 210 or on the storage device of the first computing device 102. After user registration, the control goes back to the step 504.

If yes at step 504, then step 508 is executed. At step 508, the registration and authentication module 206 determines and checks if the user is an authorized user i.e. the user is authorized to use the first computing device 102. The registration and authentication module 206 compares the login credentials with stored records to find a matching record. If a matching record is found the user is considered an authorized user, else user is not an authorized user. The registration and authentication module 206 determines the first user 114 is an authorized user then step 510 is executed else step 508 is executed or the user may be prompted to register again in some embodiments.

Then at step 510, the at least one video monitoring device 106 starts capturing video frames of the first user 114 and his/her associated workplace that may include his background, desk, etc. The video frames may be recorded by imposing privacy layers as discussed above. The video frames may be supplied to the processing module 208 for analysis.

At step 512, the processing module 208 processes and analyses the video frames and/or a video stream in real-time to determine if there is at least one object of interest present in and around the first user/workplace. Non-limiting examples of the object of interest includes a pen, a weapon, a paper, a notebook, a camera, an audio/video recorder, another laptop/computer. In some embodiments, the processing module 208 may use method 300 for determining if there is at least one object of interest present.

Then at step 514, the processing module 208 checks if any object of interest is detected based on the processing done at step 512. If yes, then step 516 is executed, else the video monitoring device continues capturing the video frames at step 510. In an exemplary scenario, when a pen and paper is detected as the object of interest then step 516 is executed. The objects of interest may include unauthorized objects, unlisted objects, and defective objects (such as in factory lines). The action(s) of interest may include unauthorized actions, unlisted actions, and abnormal actions, such as disorientation.

At step 516, the processing module 208 analyses the captured video frames and/or a video stream captured/streamed in real-time to determine an action of interest (may also be referred as action) of the object of interest detected at step 512. The action of interest may include unauthorized actions, unlisted actions, and abnormal actions, such as disorientation. Then at step 518, the processing module 208 checks if an action of interest is detected, if no action of interest detected then step 510 is executed else step 520 is executed. In an exemplary scenario, if pen and paper are being used (may be by the first user 114) to write something on, then the processing module 208 may consider it as an action of interest of the object of interest. In some embodiments, the processing module 208 may use above-disclosed method 400 for analysing the captured video frames to determine/detect an action of interest of the object of interest detected.

At step 520, the processing module 208 analyses the video frames to determine if the object of interest and/or the action of interest is passing a predefined threshold stored in the storage module 210. For example, if the pen and paper has been detected but the pen is just being held in hand by the first user 114 and not being used for writing then the pen might not have passed the threshold. On the contrary if the pen is being used to write something on the paper or desk, then the action of the pen may be considered as has passed the threshold.

At step 522, the processing module 208 checks if the detected object of interest/action of interest is exceeding the predefined threshold, if yes then step 524 is executed else step 510 is executed. At step 524, the processing module 208 stores the video frames of the object of interest/action of interest in the storage module 210 or in the storage device of the first computing device 102. In some embodiments, the processing module 208 may compress the video frames and/or encrypt prior to storing. The video frames may be stored for a predefined time period for example, 1 month, 6 months, 1 year etc.

Thereafter at step 524, the transceiving module 204 encrypts and sends the video frames of the object of interest (s) and associated action of interest to the server 108 (and/or the second user 120) over the virtual private network for further analysis.

When the client monitoring module 202 is a stand-alone system then the video frames are not sent to the server 108. However, the processing module 208 may further analyse the video frames to identify a threat and take a preventive action. The preventive action may include at least one of sending a warning message to the user 114, ending a session of the user 114 on the computing system 102, shutting down a display of the computing device 102, and blocking access to the first computing device 102 or applications running on the computing device 102.

In some embodiments, the client monitoring module 202 is configured to provide health and wellness recommendations to the first user 114. For example, when the first user 114 sits in front of the computer (office computer) for more than X minutes (like 20 minutes, 30 minutes), the client monitoring module 202 may send a notification to the user 114 to take a break, get hydrated or get to move and follow some stretches, displayed on the screen. The client monitoring module 202 (or the module 208) monitors the first user's 114 actions to evaluate if the first user 114 follows the recommendations. Optionally, if an employer desires, the client monitoring module 202 can measure the responsiveness of the user 114 to these recommendations and may reward those first users 114 that follow them. In embodiments, where all the processing (i.e. object and action of interest detection, taking preventive action etc.) Is performed by the server analysis module 110, then the above mentioned functions of the client monitoring module 202 are performed by the server analysis module 110. In some embodiments, when all the processing (i.e. object and action of interest detection, taking preventive action etc.) is done by the supervisor monitoring module 118, then the above mentioned functions of the client monitoring module 202 are performed by the supervisor monitoring module 118.

FIG. 6 is a flowchart illustrating a method 600 for processing a video of the object of interest received on the server 108 from the first computing device 102 of the first user 114, in accordance with an embodiment of the present disclosure. As discussed with reference to FIGS. 5A-5C, the video or video frames showing the object of interest(s) and associated action are sent to the server 108 for further processing and analysis. In some embodiments, the video frames showing the object of interest(s) and associated action are sent to the second computing device 116, in such embodiments, the method 600 may be performed by the supervisor monitoring module 118. In some embodiments, the video frames showing the object of interest(s) and associated action may be sent to more than one server.

At step 602, the server 108 receives the video (or video frames) showing the object of interest(s) and associated action from the first computing device 102 for further analysis. At step 604, the server analysis module 110 processes and analyses at least one of the received video/video frames and a video stream in real-time to determine if there is an object of interest in the workplace of the first user 114. The video stream may include video frames of the first user that are being captured and streamed to the server analysis module 110 (or the server 108) by the video monitoring device 106 in real-time. The server analysis module 110 may analyse the video/video frames and video stream by focusing on the first user 114 and his/her behavior.

Then at step 606, the server analysis module 110 processes and analyses the received video/video frames to determine if there is an action of interest of the object of interest and if it can be considered as a threat. In an exemplary embodiment, the action may be considered a threat if its passing a certain predefined threshold. For example, if detected object of interest is a mobile phone having a camera, and detected action is that the mobile phone was just moved to another location on the desk (table), and then this action may not be considered as a threat. However, if a light is blinking on the mobile phone suggesting a recorder is on or camera is on, or if the first user 114 is moving the mobile phone near the screen of the laptop then this action may suggest as if the first user 114 is trying to record some information from the screen and hence this action may be considered as a threat that may require further investigation (may be by the second user 120).

At step 608, the server analysis module 110 stores the analysed video/video frames in case of detection of the threat on a storage device (e.g. a hard disk) of the server 108.

Thereafter at step 610, the server analysis module 110 sends an alert message along with the analysed video/video frames to the second user 120 (or some other server or user in some embodiments) for further investigation. In some embodiments, the server analysis module 110 may only send the alert message to notify the second user 120 that some video requires second user's attention. The second user 120 may investigate the analysed video and/or a video stream received from the video monitoring device 106 in real-time manually and/or by using the supervisor monitoring module 118 and generate a report accordingly. In some embodiments, at least one of the client monitoring module 104, server analysis module 110, and the supervisor monitoring module 118 may store records and log of incidents containing the time of the incident, action of interest, object of interest, etc. This information can be used (for instance by the second user 120) for investigation, such as forensic investigation of internal threat or accidents.

In some embodiments, the supervisor monitoring module 118 may also suggest some steps that can be taken next to handle the threat or action of interest situation. For example, the supervisor monitoring module 118 may generate a warning message for the first user 114, that second user 120 can review the warning message and send it to the first user 114.

In an exemplary scenario, the first user 114 is an employee of an organization; hence organization is an employer of the first user. The server 108 is a server device located in an office of the organization. The second user 120 is a manager or supervisor of the first user 114. If the employee works from office, then his/her workplace includes a desk/table, bit of his/her surroundings. Then to login to the system or the first computing device i.e. a laptop of the employee, the employee may gaze into the video monitoring device i.e. a webcam installed at an appropriate angle and location so as to get a birds eye view of the employee and his/her workplace. Now as soon the employee provides credentials and authenticated (by the client monitoring module running on or connected to the laptop), the webcam starts capturing/streaming the audio/video/pictures of the employee in real-time. The video frames are also being processed and analysed in real-time by the client monitoring module to determine if there is any object of interest in the workplace of the employee, and if there is any object of interest like a camera on the desk, then the client monitoring module starts processing to determine an action of the camera. Further, not all action of the camera will be considered as suspicious. For example, if the camera has just been moved from one place to other on the desk, then this is not suspicious and no video saving and reporting needed. However, if the camera is being used to capture images of the office laptop of the employee, then this action may be considered as passing a predefined threshold. Therefore, the client monitoring module will store a copy of the video frames showing the camera and the associated action of interest, encrypt and send the copy of the video (i.e. encrypted video) to at least one server for further processing. The server (or the server analysis module) may process and analyse the video frames by focusing on the employee and his/her behavior/intentions to determine if his/her actions can pose any threat for the organization. If the server determines any threat based on the analysis, then the server may also store a copy of the analysed video and send an alert message along with the analysed video to the manager/supervisor of the employee for investigation. The supervisor monitoring module may enable the manager/supervisor to view status and performance of the employee in a color coded manner (for example, the employee may be shown in red color if the employee is using an object of interest during working hours); investigate the analysed video frames showing the at least one object of interest and associated action upon receiving the alert message from the server; and generate one or more reports based on the investigation. The non-limiting examples of the status and performance may include the time spent by the first user 114 in front of the computer, hours sitting, number of times standing, etc.

In an embodiment, the supervisor may send a warning message to the employee.

An embodiment of the present disclosure provides a system for monitoring a plurality of users and their associated workplace. The system primarily includes a client monitoring module in communication with or running on a first computing device of a first user, a server that may be cloud based server or a local server located within a network (e.g. VPN) of an organization (i.e. employer of the first user), and a supervisor monitoring module comprising a user interface for a second user. The supervisor monitoring module may be connected to or installed and running on a second computing device accessing to the second user. In some embodiments, the second user may be supervisor or manager of first user.

The server may be a backend server of the organization that may allow the organization to store the login information and the activity information that has been retrieved from every first computing device (may also be referred as an employee node without change in its meaning). The user interface for the second user may be a web based user interface that may allow the second user(s) (e.g. the supervisors) to check and view the status and performance of the first user that the second user is supervising or managing. The status of the first user may include, but is not limited to, inactive, active (normal), active (fraud or action of interest association) or disconnected. Further, the supervisor monitoring module is configured to tag or associate the first user with a status. In an exemplary scenario, when the user interface displays the first user being tagged (e.g. by the supervisor monitoring module) as active with a fraud (or action of interest) association, the supervisor has the capability of reviewing a specific video frame or video footage that triggered this active with a fraud (or action of interest) association status. The client monitoring module may be configured to allow the first user(s) to be monitored without compromising their privacy and with a minimal overhead in the processor (e.g. central processing unit) of the first computing device utilization. The client monitoring module is in connection with at least one video monitoring device configured to continuously capture video frames (or video stream/footage) of the first user. The client monitoring module processes and analyses the video stream for object of interest detection and accordingly action of interest detection.

The client monitoring module may enable the first user to configure the first computing device and associated input devices (e.g. the keyboard, monitor, mouse, video monitoring device) as per the system guidelines for example guidelines to setup the video monitoring device, and input devices of the first computing device. The client monitoring module is configured to recognize the input devices associated with the first computing device e.g. the keyboard, monitor, and mouse of the first user to adapt to its configured setup. In an example, the setup may include setting up the video monitoring device at a particular location or angle so as to cover a top view of the first user and his/her associated workplace. Further, the setup may include recognition of objects allowed (such as mouse, keyboard etc.) in the workplace of the first user.

In some embodiments, the client monitoring module also includes an artificial intelligence based processing module that may be configured for Object detection. The processing module may utilize a custom object detection model (AI model for object detection) based on a hybrid design that utilizes a MobileNetV3 backbone along with a YOLO (You Only Look Once) neck and head of the network. MobileNetV3 is a convolutional neural network that is 53 layers deep. In some embodiments, the MobileNetV3 is a pre-trained version of the network trained on more than a million images from the ImageNet database. The ImageNet database is an image database organized according to the WorldNet hierarchy and contains 14,197,122 annotated images according to the WordNet hierarchy. In some embodiments, the pre-trained network can classify images into 1000 object categories, such as keyboard, mouse, pencil, and many animals. YOLO is an algorithm that utilizes neural networks to provide real-time object detection, YOLO is an end-to-end deep learning mod& for fast and accurate object detection. In some embodiments, the custom object detection model used by the processing module has been trained to detect objects such as mobiles, pens, paperwork, notebooks, cups, silverware, food, people, and other classes from a top view perspective. Hence, the custom object detection model enables the processing module to detect objects such as mobiles, pens, paperwork, notebooks, cups, silverware, food, people, and other classes from a top view perspective.

The processing module uses object detection for the spatial identification of the setup (i.e. the configuration of video monitoring device etc. done by the first user for proper functioning of the client monitoring module), which requires the first user to have the required top view setup (of the video monitoring device like camera) configured when using the client monitoring module and/or the first computing device. When the main AI loop runs, the processing module of the client monitoring module identifies the objects in the scene (i.e. the area/workplace captured by the video monitoring device) and the objects potentially associated with a fraud (or objects of interest) are immediately tagged or labelled (may be highlighted in a specific colour). The processing module is configured to track every specific object detected in the scene in order to preserve every element along across the video stream (video frames). In some embodiments, the processing module may filter the bounding boxes (coordinates) of each object using a soft the Non Maximum Suppression (NMS) (or any other suitable algorithm or technique for identifying objects) and then are used to identify the objects of interest in the scene. The NMS is a technique used in various computer vision tasks. It includes a class of algorithms to select one entity (e.g., bounding boxes) out of many overlapping entities (bounding boxes).

After detecting and labelling the objects, the processing module may create their instances as tracks that can be integrated into a tracking logic. In order to enhance the robustness of the detections against outliers, the system (i.e. the processing module or the server analysis module in some embodiments) is encompassed in a tracking logic, which may allow every object to be identified during a window of time (e.g. 2 seconds, 5 seconds, 20 milliseconds etc.), given the fact that some objects can be mistaken due to the possible low quality of the video streaming. The tracking logic may allow the processing module to detect every object uniquely and filter outliers. The tracking logic may also allows the feedback (e.g., alert messages sent) to the second user (e.g. supervisor) to be non-redundant since the tracking logic allows each object that is the source of an alert message to be tagged as an object that already sent the alert message. In some embodiments, the tracking logic may also enhance the certainty of the detection of an instance since it allows the system to have an aggregated probability score of each instance, therefore reducing the false positive rate of the object detection by the processing module.

In some embodiments, the system (or the processing module of the client monitoring module) integrates a blocklist system configured to remember specific images that are going to be ignored from sending an alert message to the second user or the supervisor. The integration the blocklist system into the system may prevent a user (second user) from sending/receiving infinite alert messages or notifications about the same object, and learn about objects that can be mistaken as threats (or object of interest) that shouldn't send any alert message/notification. This blocklist system may include reinforcement learning algorithms.

In some embodiments, the processing module integrates (or includes) the tracking logic and the blocklist system. In alternative embodiments, the server includes the tracking logic and the blocklist system. In other embodiments, the supervisor monitoring module includes the tracking logic and the blocklist system.

Further, the system (or the processing module of the client monitoring module) is also configured to identify person. This means the system is also able to detect when the first user has been away from the scope of the video monitoring device (i.e. the camera). Additionally, the system is configured to detect presence of more than one person in the scene (or workplace of the first user) and may tag it as a fraud-triggering event or action. However, it is important to identify that the first user that is allowed to use the first computing device (e.g. the computer) is the person in the scene/workplace. For this, the system may also integrate or use a face verification step. For the face verification to work, the first user has to register his/her face using the user registration and authentication module of the client monitoring module (See FIG. 2). The face registration/verification may allow the first user to be identified as the authorized user by the user registration and authentication module when the system starts running. After that, from the video monitoring device (e.g. a camera setup so as to capture a top view of the first user and the workplace), the first user can be monitored so that there is a certainty that the first user is the same that was initially authorized.

The system is also configured to detect an action of interest of an object of interest. The processing module may perform the detection of the action of interest, but in some embodiments, the server or the supervisor monitoring module may do this. In order to further enhance detection of action of interest (that may be or result in a potential fraud), the system uses action recognition/detection models (AI based models for action detection) configured to further filter specific events that can be triggered by the presence of fraud-tagged (or labelled) objects of interest, such as mobile phones. The action recognition/detection model are neural network based models that can be trained with different specific actions, such as mobile phone use that could be assessed when triggered by the presence of a mobile phone (i.e. object of interest) by the object detection by the processing module as explained above. In an example, the architecture of the action recognition/detection model is based on the MOVINETS architecture and is used over a buffer of 50 frames. For this, after a moving buffer of the last 50 frames is always collected, such that when the triggering event happens (e.g. detection of an object of interest), the action recognition runs with the buffer (or video frames) as an input.

In some embodiments, the video monitoring device is configured to continuously capture video frames or continuously stream video of the first user. The processing module may continuously process and analyse the video frames/ stream in real time to detect an object of interest. The detection of object of interest may act as a triggering event for initiating detection of an action of interest. The processing module then may start detecting the action of interest in that specific video frames or video stream that is being captured or streamed at that specific time. The object or interest detection and action of interest detection are performed by processing and analysing the video frames/video streams that are being captured or streamed at that particular time (i.e. in real-time).

The system is configured to process and analyse the video frames and steams in real time. For example, if an object of interest is detected (e.g. by the processing module) in a video stream, this may initiate action detection that is performed on the video stream being captured in real time. In some embodiments, an alert message may be sent to the second user upon detection or at least one of an object of interest and an action of interest. The alert message may include a video stream showing the object of interest and the action interest. The supervisor monitoring module may analyse the received video stream as well as the video stream that is being received (e.g. from the video monitoring device) in real-time for further analysis.

The methods disclosed in the present disclosure are configured to run on legacy computing devices, like old window versions based computers/laptops, android based smart phones, and new computing devices also for example, iOS based laptops, smart phones, computers etc.

In some embodiments, the disclosed systems of monitoring users (e.g. first user) and associated workplaces may be integrated with other software and platforms. For example, the system can be integrated with call centre management software for example, to secure the client account of the specific customer that is potentially vulnerable to the fraud incident or threat.

In some embodiments, the disclosed system of monitoring users (e.g. first user) and associated workplaces is an Edge-AI-based system configured to provide end-to-end solution that is very accurate, secure, cost-effective, simple to use and highly scalable.

In some embodiments, the disclosed system for workforce monitoring (i.e. the users and their workplaces) is fully customizable for remote working while maintaining the personal privacy of the workers and customers, without leveraging any third-party cloud infrastructure.

The disclosed system of monitoring users (e.g. first user) and associated workplaces is configured to process the video frames in two stages i.e. first stage analysis and second stage analysis. This may save significant bandwidth and computation overhead. In some embodiments, the first stage analysis is performed on the first computing device 102 and the second stage analysis is performed on the server 108 or the second computing device. In some embodiments, the first stage analysis may include object of interest and action of interest detection and the second stage analysis may include threat detection and taking a preventive action. In the second stage analysis, the server 108 and/or the second computing device 108 performs complex action of interest detection and behavioral analysis, focusing on the behaviors of the first user, without knowing their identity, their color of skin, facial information or any other personally identifiable information. The complex behavioral analysis in performed on the selective number of videos that have been already flagged and identified by the client monitoring module during the first stage analysis. The second stage analysis includes comprehensive analysis to assess the threat and eventually alert the human supervisor (i.e. the second user 120). For example, to frequently evaluate the decision-making process on the captured videos, and learn and improve the accuracy of first decision makers (e.g. supervisors of the first user 114) and or learn from the dependencies of variables, such as type of incident/threat, type of object, frequency, time, and several other parameters.

In some embodiments, the client monitoring module 102 running on the first computing device 102 itself performs the first and second stage analysis of the video frames.

The systems and methods described above can also be implemented for workforce monitoring in industrial and manufacturing spaces, logistics and transportation (for example drivers in driving seats), proctoring, detection of weapons (such as guns and knives) in classrooms, etc. Further, the disclosed systems and method of the present disclosure can be used in any industry or work environment requiring monitoring of people (or suspicious people) and object of interest.

Method claims set forth below having steps that are designated by letters or numbered should not be considered to be necessarily limited to the particular order in which the steps are recited.

Embodiments of the disclosure are also described above with reference to flowchart illustrations and/or block diagrams of methods and systems. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flowchart and/or block diagram block or blocks. These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flowchart and/or block diagram block or blocks.

In addition, methods and functions described herein are not limited to any particular sequence, and the acts or blocks relating thereto can be performed in other sequences that are appropriate. For example, described acts or blocks may be performed in an order other than that specifically disclosed, or multiple acts or blocks may be combined in a single act or block.

While the invention has been described in connection with what is presently considered to be the most practical and various embodiments, it is to be understood that the invention is not to be limited to the disclosed embodiments, but on the contrary, is intended to cover various modifications and equivalent arrangements.

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A system for monitoring one or more users and workplaces of the one or more users in real-time, comprising:
   at least one video monitoring device configured to capture video frames of a first user of the one or more users and workplace of the first user post authentication of the first user;
   a client monitoring module comprising:
      a transceiving module configured to receive login credentials from the first user;
      a user registration and authentication module configured to authenticate an identity of the first user based on the received login credentials;
      a processing module configured to:
         process and analyse the captured video frames in real-time to determine if at least one object of interest is present in the workplace; and
         upon detection of the at least one object of interest, determine at least one action of interest of the at least one object of interest; and
         determine if at least one of the object of interest and action of interest is passing a predefined threshold of the object of interest; and
         take a preventive action when the at least one of the object of interest and action of interest passes the predefined threshold.

2. The system of claim 1, wherein the client monitoring module is at least one of communicably connected to or installed within a first computing device associated with the first user.

3. The system of claim 2, wherein the preventive action comprising at least one of sending a warning message to the first user, ending a session of the first user on the first computing device, encrypting and sending video frames showing the at least one object of interest and associated action of interest to at least one of a server and a second computing device associated with a second user, and blocking access to the first computing device or applications running on the first computing device.

4. The system of claim 3, wherein the transceiving module is further configured to encrypt and send one or more video frames showing the at least one object of interest and action of interest to at least one of a server and a second computing device associated with a second user when the at least one of the object of interest and action of interest passes the predefined threshold, wherein the server includes a server analysis module to assess a threat.

5. The system of claim 4, wherein the server analysis module is further configured to:
   analyse at least one of the received one or more video frames and video stream in real-time to assess the threat, wherein the analyzing comprises action of interest detection and behavioral analysis of the first user while maintaining the privacy of the first user and workplace of the first user; and
   upon detection of the threat, perform at least one of:
      take at least one preventive action; and
      send an alert message along with the analysed video frames showing the at least one object of interest and associated action of interest to the second computing device for further analysis, wherein the alert message along with the analysed video frames is encrypted prior to sending.

6. The system of claim 5, wherein the second computing device further comprises a supervisor monitoring module configured to perform at least one of the following steps:
   assign the one or more users to at least one second user for supervision;
   display status and performance of the first user in a color coded manner on the second computing device; and
   upon receiving at least one of the one or more video frames showing the at least one object of interest and associated action of interest from the client monitoring module and the alert message from the server, perform the following steps:
      analysing at least one of the received one or more video frames and a video streaming in real-time to assess the threat, wherein the analysis comprises action of interest detection and behavioral analysis of the first user while maintaining the privacy of the first user and workplace of the first user; and
      taking at least one preventive action based on the assessment of the threat.

7. The system of claim 1, wherein the processing module is further configured to guide the first user for installing the at least one video monitoring device.

8. The system of claim 7, further comprising a storage module configured to store data comprising at least one of captured video frames, analysis data, user information, information about a plurality of object of interest, preventive actions, warning messages, action of interest associated with object of interest, captured video frames of the object of interest/first user, predefined threshold of the plurality of object of interest, authentication data, type of incidents, time of incidents, user guide, and user registration information, wherein the storage module is located on at least one of the first computing device, the client monitoring module, the at least one server, and the second computing device.

9. The system of claim 8, wherein the processing module is further configured to:
   receive a feedback about the accuracy of the detection of the object of interest and the action of interest from at least one of the at least one server and the second user; and
   continuously improve the object of interest detection and action of interest detection based on the feedback.

10. A method for monitoring one or more users and workplaces of the one or more users in real-time, comprising:

receiving, by a client monitoring module associated with a first computing device, login credentials from a first user of the one or more users; and authenticating, by the client monitoring module, an identity of the first user based on the received login credentials;

capturing, by at least one video monitoring device communicably connected to the client monitoring module, video frames of the first user and workplace of the first user post authentication;

processing and analyzing, by the client monitoring module, the captured video frames in real-time to determine if there is at least one object of interest present in the workplace;

upon detection of the at least one object of interest, determining, by the client monitoring module, at least one action of interest of the at least one object of interest;

determining, by the client monitoring module, if at least one of the object of interest and action of interest is passing a predefined threshold of the object of interest; and taking, by the client monitoring module, a preventive action when the at least one of the object of interest and action of interest passes the predefined threshold.

11. The method of claim 10, wherein the client monitoring module is at least one of communicably connected to or installed within a first computing device associated with the first user.

12. The method of claim 11, wherein the preventive action comprising at least one of sending a warning message to the first user, ending a session of the first user on the first computing system, encrypting and sending video frames showing the at least one object of interest and associated action of interest to at least one of a server and a second computing device associated with a second user, and blocking access to the first computing device or applications running on the first computing device.

13. The method of claim 12 further comprising encrypting and sending, by the client monitoring module, one or more video frames showing the at least one object of interest and action of interest to at least one of a server and a second computing device associated with a second user when the at least one of the object of interest and action of interest passes the predefined threshold, wherein the server includes a server analysis module to assess a threat.

14. The method of claim 13 further comprising performing, by the server analysis module, at least one of the following steps:

analysing at least one of the received one or more video frames and a video streaming in real-time to assess the threat, wherein the analyzing comprises action of interest detection and behavioral analysis of the first user while maintaining the privacy of the first user and workplace of the first user; and upon detection of the threat, performing at least one of:
taking at least one preventive action; and
sending an alert message along with the analysed video frames showing the at least one object of interest and associated action of interest to the second computing device for further analysis, wherein the alert message along with the analysed video frames is encrypted prior to sending.

15. The method of claim 14 further comprising performing, by a supervisor monitoring module of the second computing device, at least one of the following steps:

assigning the one or more users to at least one second user for supervision;

displaying status and performance of the first user in a color coded manner on the second computing device; and upon receiving at least one of the video frames showing the at least one object of interest and associated action of interest from the client monitoring module and the alert message from the server, performing the following steps:

analysing at least one of the received one or more video frames and a video streaming in real-time to assess the threat, wherein the analyzing comprises action of interest detection and behavioral analysis of the first user while maintaining the privacy of the first user and workplace of the first user; and taking the preventive action based on the assessment of the threat.

16. The method of claim 10 further comprising guiding, by the processing module, the first user for installing the at least one video monitoring device.

17. The method of claim 16 further comprising storing, in a storage module, data comprising at least one of captured video frames, analysis data, user information, information about a plurality of object of interest, preventive actions, warning, action of interest associated with object of interest, type of incidents, time of incidents, captured video frames of the object of interest/first user, predefined threshold of the plurality of object of interest, type of incidents, time of incidents, authentication data, user guide, and user registration information, wherein the storage module is located on at least one of the first computing device, the client monitoring module, the at least one server, and the second computing device.

18. The method of claim 17 further comprising:

receiving, by the processing module, a feedback about the accuracy of the detection of the object of interest and the action of the action of interest from at least one of the at least one server and the second user; and continuously improving, by the processing module, the object of interest detection and action of interest detection based on the feedback.

19. A system for monitoring a user and workplace of the user in real-time, comprising:

at least one video monitoring device configured to continuously capture video frames of the user and a workplace of the user after authentication of the user;

a computing device including a client monitoring module configured to:

receive login credentials from the user;

authenticate an identity of the user based on the login credentials;

process and analyse the captured video frames in real-time to detect if there is at least one object of interest present in the workplace of the user;

determine at least one action of interest of the detected at least one object of interest upon detection of the at least one object of interest;

determine if at least one of the object of interest and action of interest is passing a predefined threshold of the object of interest;

store the video frames showing the at least one object of interest and associated action of interest on the computing device when the object of interest passes the predefined threshold;

analyse at least one of the video frames showing the at least one object of interest and associated action of interest and video streaming in real-time to assess a threat; and take a preventive action upon detection of the threat.

20. The system of claim 19, wherein the preventive action comprising at least one of sending a warning message to the user, ending a session of the user on the computing system, shutting down a display of the computing device, and blocking access to the first computing device or applications running on the first computing device.

* * * * *